United States Patent
Ac et al.

(10) Patent No.: US 8,313,108 B2
(45) Date of Patent: Nov. 20, 2012

(54) STIFFNESS CONTROL USING SMART ACTUATORS

(75) Inventors: Shivaram Ac, Bangalore (IN); Amol G. Thakare, Akola (IN); Vidyashankar R. Buravalla, Bangalore (IN); Srinivasan Suryanarayan, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

(21) Appl. No.: 12/841,232

(22) Filed: Jul. 22, 2010

(65) Prior Publication Data

US 2012/0018962 A1      Jan. 26, 2012

(51) Int. Cl.
*B60G 17/00* (2006.01)
*B60G 17/015* (2006.01)

(52) U.S. Cl. .................. 280/5.5; 280/5.511; 280/5.512; 280/5.515

(58) Field of Classification Search .................. 188/267, 188/267.1, 267.2, 266.1; 267/168, 289, 290; 280/5.5, 5.512, 5.515, 5.516, 5.519, 5.508, 280/5.511; 60/527, 528, 530
See application file for complete search history.

(56) References Cited

U.S. PATENT DOCUMENTS

| | | | | | |
|---|---|---|---|---|---|
| 2,301,742 | A | * | 11/1942 | Muller | 267/290 |
| 2,989,301 | A | * | 6/1961 | Johannsen | 267/34 |
| 4,790,522 | A | * | 12/1988 | Drutchas | 267/225 |
| 4,909,535 | A | * | 3/1990 | Clark et al. | 280/5.515 |
| 5,018,606 | A | * | 5/1991 | Carlson | 188/267.1 |
| 5,170,866 | A | * | 12/1992 | Ghaem | 188/267.1 |
| 5,263,695 | A | * | 11/1993 | Bianchi | 267/225 |
| 5,845,753 | A | * | 12/1998 | Bansbach | 192/21.5 |
| 6,102,378 | A | * | 8/2000 | Gieseler et al. | 267/34 |
| 6,491,291 | B1 | * | 12/2002 | Keeney et al. | 267/190 |
| 7,243,606 | B2 | * | 7/2007 | Hommen et al. | 105/453 |
| 7,249,776 | B2 | * | 7/2007 | Bryant | 280/124.179 |
| 7,275,750 | B2 | | 10/2007 | Suchta et al. | |
| 7,810,819 | B2 | * | 10/2010 | Lamers et al. | 280/5.516 |
| 7,926,823 | B2 | * | 4/2011 | Lamers et al. | 280/5.516 |
| 2003/0168295 | A1 | * | 9/2003 | Han et al. | 188/267.1 |
| 2005/0263359 | A1 | * | 12/2005 | Mankame et al. | 188/266.1 |
| 2006/0145544 | A1 | * | 7/2006 | Browne et al. | 310/12 |
| 2006/0169518 | A1 | * | 8/2006 | Thomas et al. | 180/381 |
| 2007/0132197 | A1 | * | 6/2007 | Thies et al. | 280/5.5 |
| 2009/0178892 | A1 | * | 7/2009 | Lamers et al. | 188/267 |

OTHER PUBLICATIONS http://www.bmw.com/com/en/insights/technology/technology_guide/articles/dynamic_drive.html.
http://www.trw.com/sub_system/active_dynamic_control.

* cited by examiner

*Primary Examiner* — Joseph Rocca
(74) *Attorney, Agent, or Firm* — Quinn Law Group, PLLC

(57) ABSTRACT

A stiffness control system and apparatus includes one or more stiffness elements which are each activated by a smart actuator including a smart material which may be one of a shape memory alloy (SMA), a magnetorheological (MR) fluid, an electrorheological (ER) fluid, and a piezo-stack. The stiffness control system includes a first and second interface adaptable to transmit input loads and a plurality of stiffness elements. A first stiffness element is operatively connected to the first and second interfaces and is continuously responsive to a change in system operating characteristics including input loads. A second stiffness element is selectively activated by the smart actuator so as to selectively respond to a change in system conditions. The continuous response of the first stiffness element can be selectively combined with the activated response of the second stiffness element to dynamically control system stiffness.

20 Claims, 9 Drawing Sheets

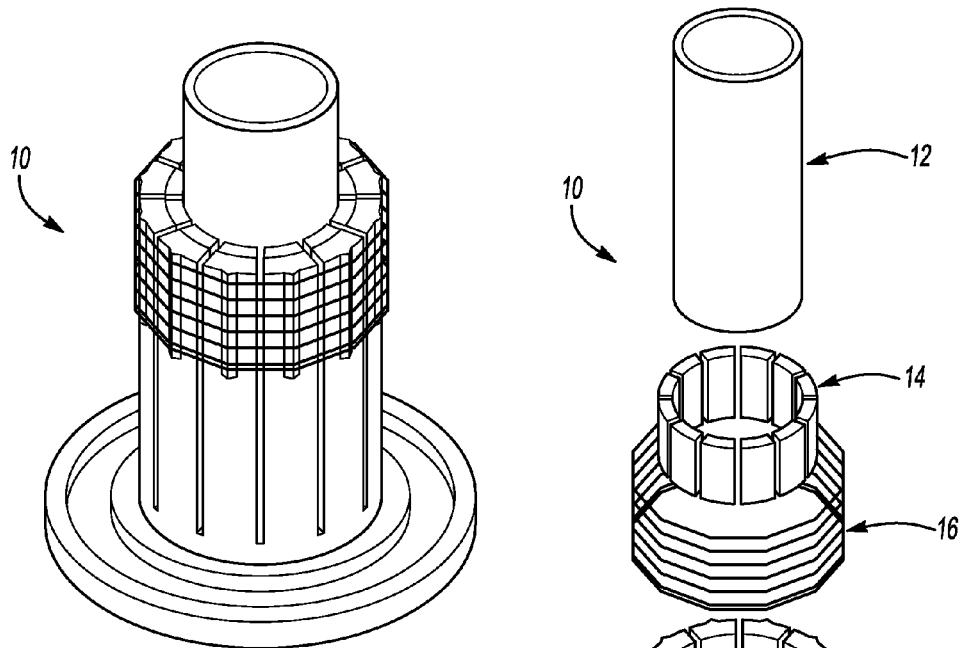
Fig-1A
Fig-1B
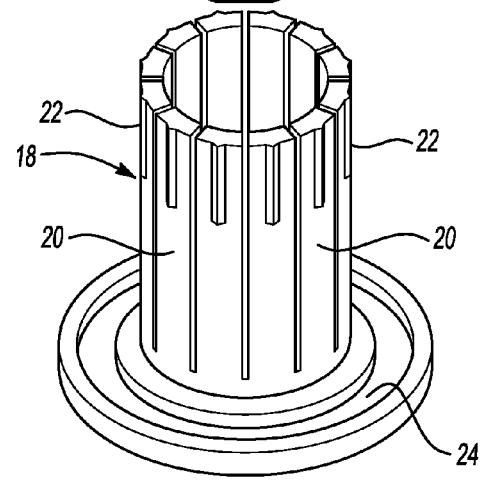
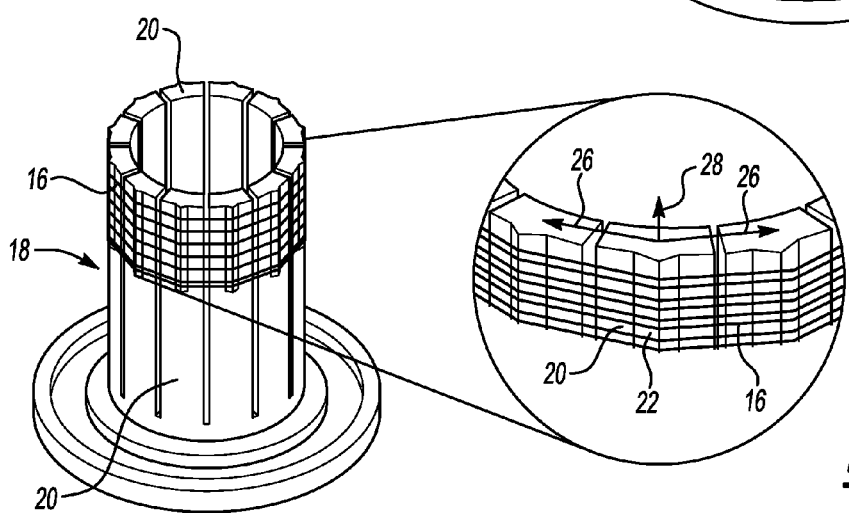
Fig-1C

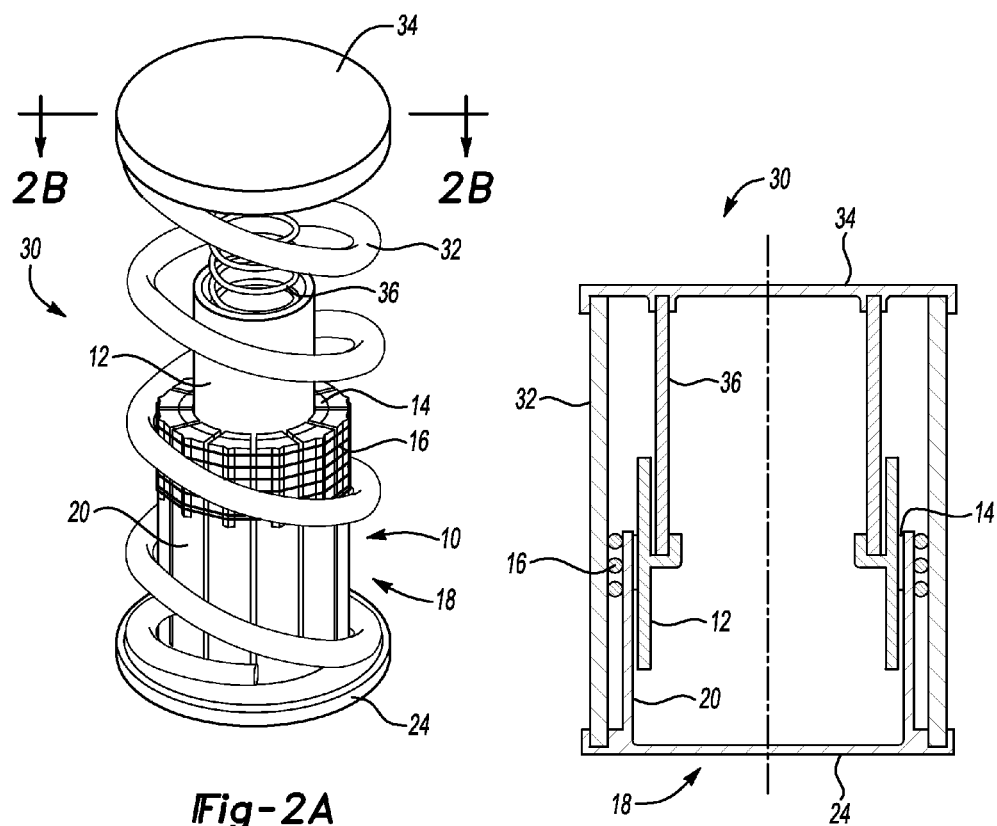
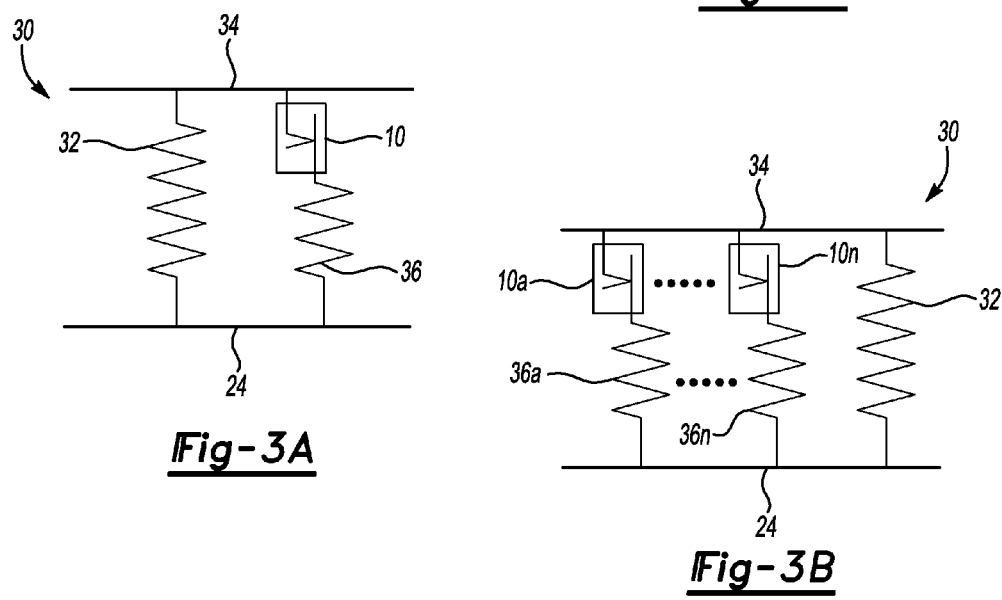

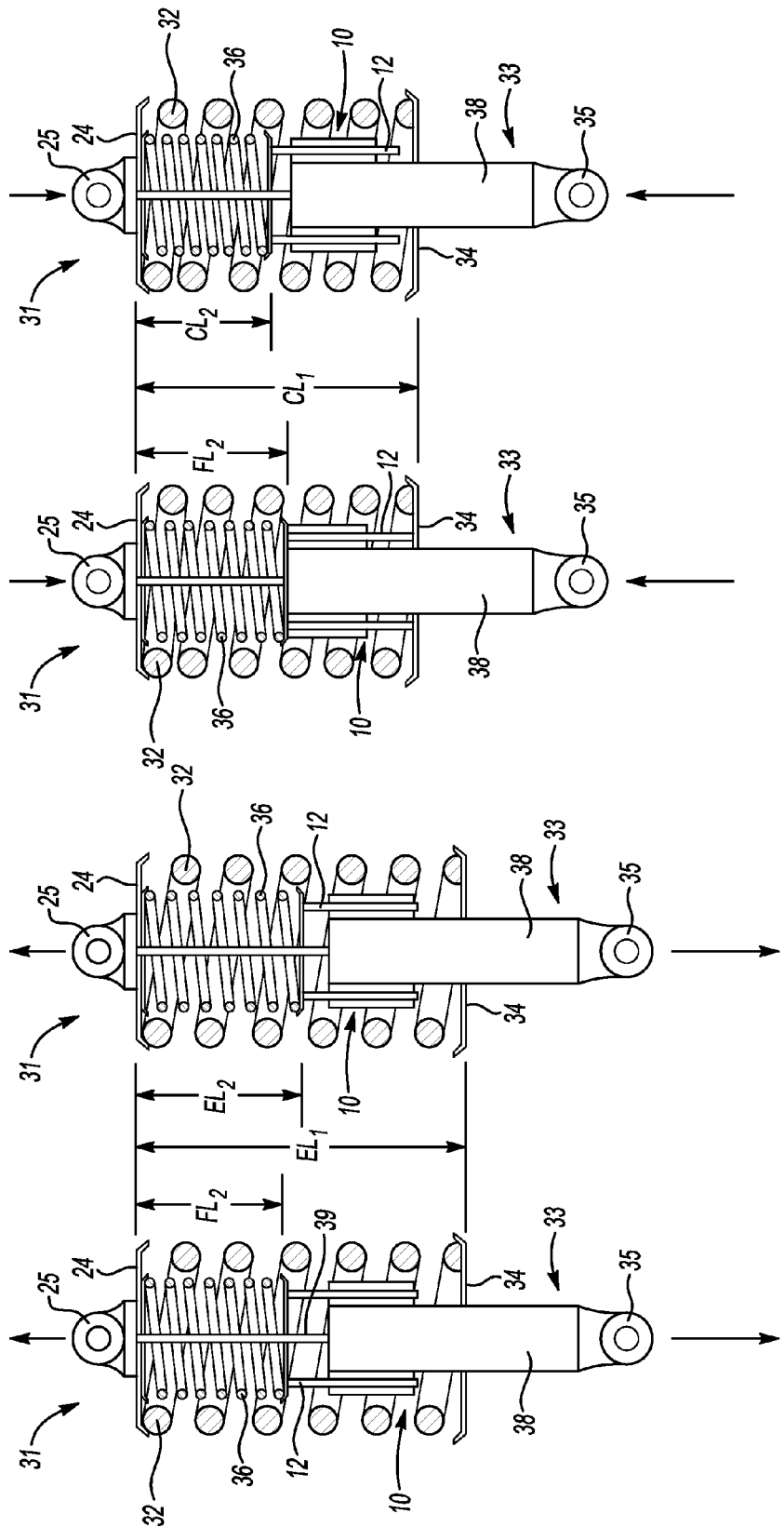

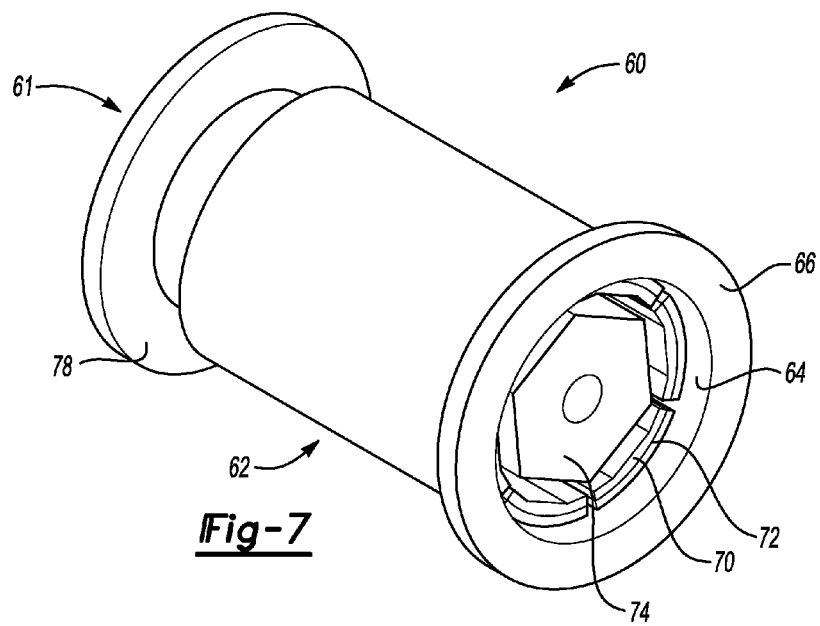
*Fig-7*
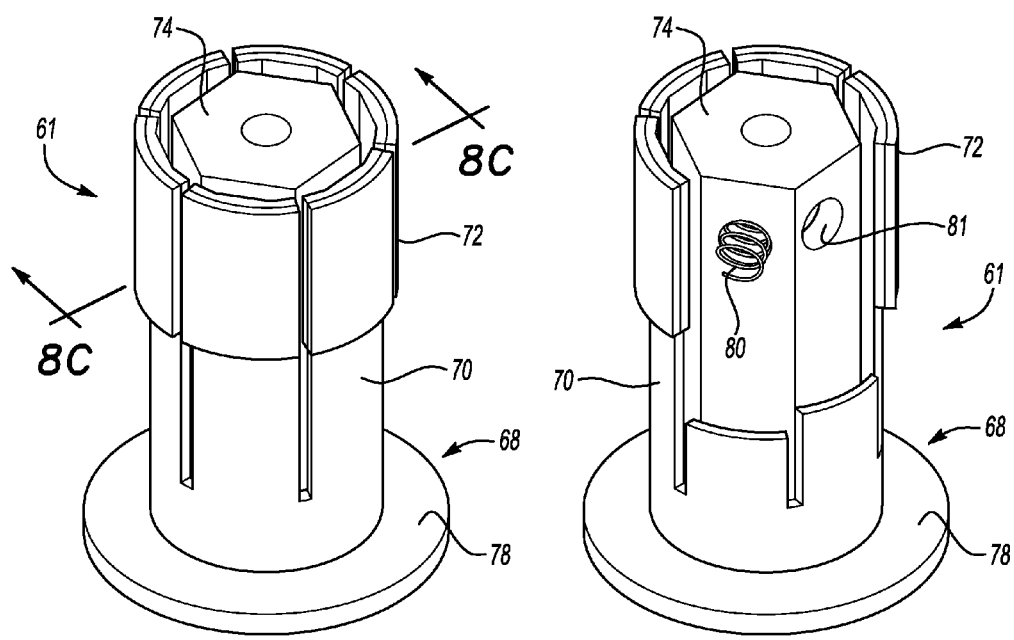
*Fig-8A*  *Fig-8B*

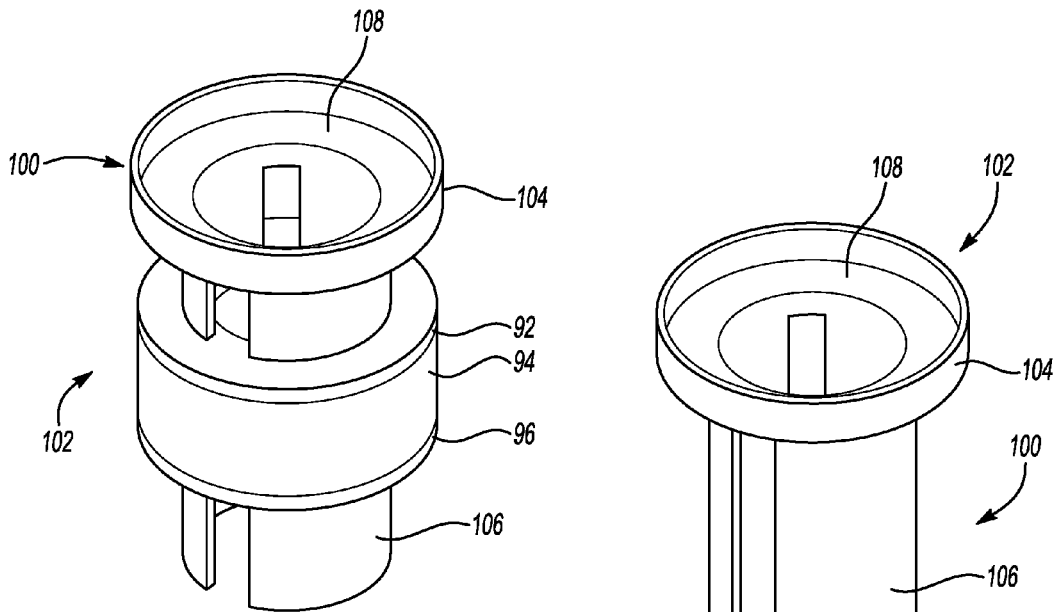
*Fig-11A*
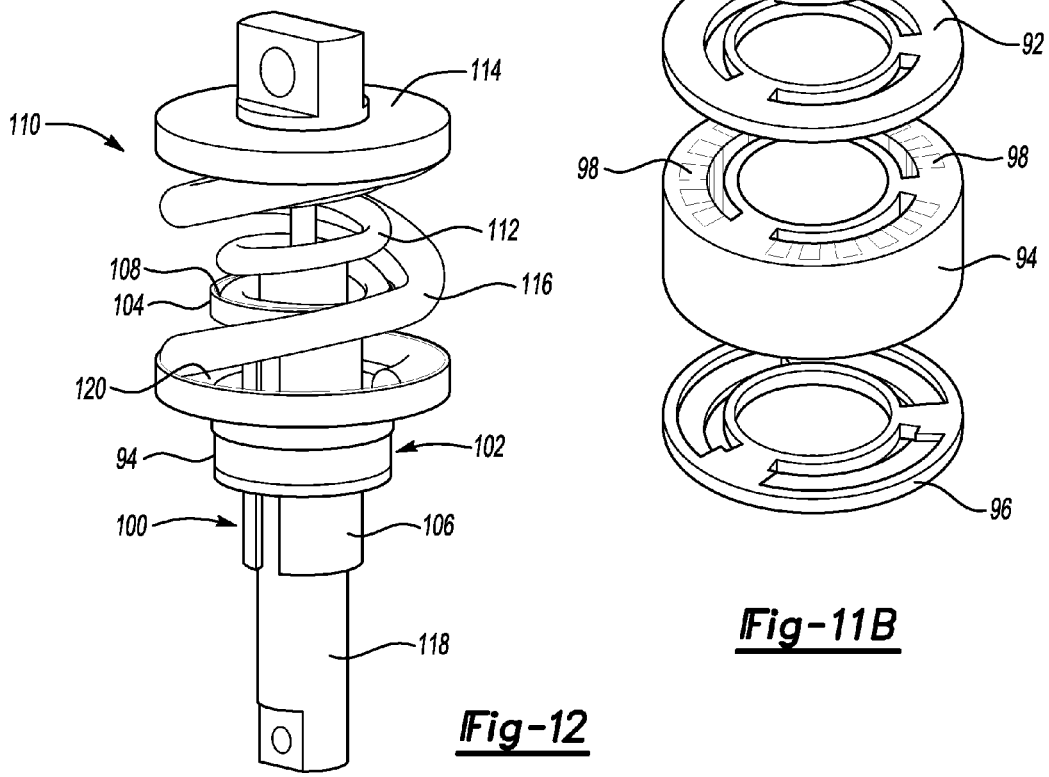
*Fig-12*
*Fig-11B*

STIFFNESS CONTROL USING SMART ACTUATORS

TECHNICAL FIELD

The present invention relates to stiffness control using smart actuators.

BACKGROUND

Stability control systems, such as vehicle chassis and suspension systems employ stiffness control elements including torsion bars, shock absorbers and other linkage and dampening mechanisms to affect ride stability, ride comfort, and roll performance of the vehicle. Ride control requirements for ride comfort, vehicle handling, vehicle stability and ground holding ability can vary significantly as driving surface conditions vary, and passive systems are limited in the range of varying conditions to which the system can respond. For example, conventional passive anti-roll torsion bars are designed with sufficient stiffness to resist vehicle roll when cornering, which may contribute to suspension harshness when the vehicle is not cornering and therefore represent a non-optimized stiffness control solution. Active or semi-active systems are available which respond to varying ride characteristics and stability control requirements, at additional expense and complexity. For example, active anti-roll bars may be configured with hydraulic actuators or electromagnetic motors which are costly, complex and require additional controls and packaging space in a vehicle.

SUMMARY

Multiple stiffness elements, configured with smart actuators, may be used to deploy additional stiffness on-demand in stiffness control systems, including vehicle stability control systems. As discussed herein, stiffness elements can be configured with smart actuators and incorporated into stability control systems to improve handling with minimal compromise in ride comfort and to enhance vehicle roll-performance by providing on-demand coupling or decoupling of the stiffness elements. Smart actuators present advantages over existing hydraulic and motor based systems including reduced cost, complexity and packaging space. Multiple stiffness elements with smart actuators may be placed in parallel or series or a combination thereof to further increase the range of stability control possible, and increase implementation options.

A system and apparatus for controlling stiffness is provided herein. The system and apparatus includes one or more stiffness elements. Each stiffness element includes one or more smart actuators, each actuator including a smart material which may be one of a shape memory alloy (SMA), a magnetorheological (MR) fluid, an electrorheological (ER) fluid, a piezo-stack, a magnetic shape memory alloy (MSMA) and a magnetostrictive material.

The stiffness control system includes a first interface adaptable to transmit a first input load, a second interface adaptable to transmit a second input load, and a plurality of stiffness elements. The first stiffness element may be operatively connected to the first interface and the second interface and configured to be continuously responsive to a change in the first and second input loads. The second stiffness element is adapted with an actuator including a smart material and is configured such that actuation of the smart material activates the second stiffness element. In a non-limiting example, the smart material may be a shape memory alloy (SMA) defining an SMA wire, an SMA spring or other shape, such as a wedge. The second stiffness element is configured in combination with the first stiffness element such that the second stiffness element is responsive to change in the first and second input loads when activated.

The smart actuator further includes an actuator body defining an actuable portion, an actuating mechanism defined by the smart material and an interfacing member. The actuable portion and the interfacing member define a slidable interface when the actuating mechanism is non-actuated. The actuable portion and the interfacing member are in operative contact such that movement of the interfacing member relative to the actuator body is prevented when the actuating mechanism is actuated. The actuator may further include a friction element operatively connected to the actuable portion. Actuation of the actuating mechanism may cause the friction element to operatively contact the interfacing member so as to prevent movement of the interfacing member relative to the actuator body. An actuating source may be in operative communication with the actuator and configured to selectively actuate the smart material in response to change in the first and second input loads. The actuating source may be an electrical current provided by one of a sensor, a controller, a switch and a combination thereof.

The stiffness control system may be further configured with sensors adaptable to sense change in vehicle operating characteristics, including changes in input loads transmitted through the first and second system interfaces. The sensors may provide signals corresponding to the operating characteristics, input loads and changes thereto. The actuating source may dynamically activate and de-activate the second stiffness element in response to the signals and changes in the operating characteristics and transmitted loads, such that the stiffness of the system can be dynamically changed in response. The system as described herein may be adaptable to the suspension system of a vehicle, to provide dynamic control of the stiffness of the vehicle suspension and to enhance and increase the range of on-demand stability control.

The system may be configured, in a non-limiting example, such that the first stiffness element may include at least one of a primary spring and a damper and the second stiffness element may include a secondary spring which is operatively connected to the first interface and the second interface when the actuator is actuated, and operatively disconnected from one of the first interface and the second interface when the actuator is not actuated. In another non-limiting example, the system may be configured such that the first stiffness element defines a primary torsion bar, and the second stiffness element defines a secondary torsion bar which is selectively connected to the first interface and the second interface when the actuator is actuated. The secondary torsion bar may include a first torsion bar segment operatively connected to the first interface, a second torsion bar segment operatively connected to the second interface, and a smart actuator configured as one of a coupling and a torque limiting device, such that the first torsion bar segment and the second torsion bar segment are selectively connected to each other when the actuator is actuated.

The stiffness control system may further include additional stiffness elements, each including an actuator wherein the actuator includes a smart material, wherein each of the additional stiffness elements is configured such that each stiffness element may be responsive to a change in operating characteristics or input loads when the stiffness element is activated. The additional stiffness elements may be arranged in combination with the first and second stiffness elements, and may be arranged in series or parallel or a combination thereof with each other.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1A is a schematic perspective view of a smart actuator;

FIG. 1B is a schematic perspective exploded view of the smart actuator of FIG. 1A;

FIG. 1C is a schematic perspective view of the smart actuator of FIG. 1A with a partial sectional detailed view of the actuator fingers;

FIG. 2A is a schematic perspective view of a spring assembly including the smart actuator of FIG. 1A;

FIG. 2B is a schematic cross-sectional illustration of section 2B-2B of the spring assembly of FIG. 2A;

FIG. 3A is a schematic illustration of the spring force path of the spring assembly of FIG. 2A;

FIG. 3B is a schematic illustration of an alternate construction of a spring force path including smart actuators;

FIG. 4A is a schematic cross-sectional illustration of a damper in an extended position including a smart actuator in an non-actuated state;

FIG. 4B is a schematic cross-sectional illustration of a damper in an extended position including a smart actuator in an actuated state;

FIG. 4C is a schematic cross-sectional illustration of a damper in a compressed position including a smart actuator in an non-actuated state;

FIG. 4D is a schematic cross-sectional illustration of a damper in a compressed position including a smart actuator in an actuated state;

FIG. 7 is a schematic perspective view of the torque limiter assembly of FIG. 6 including an alternative construction of a smart actuator;

FIG. 8A is a schematic perspective view of the smart actuator of FIG. 7.

FIG. 8B is a schematic perspective view of FIG. 8A with a partial sectional view;

FIG. 11A is a schematic perspective view of an alternative construction of a smart actuator;

FIG. 11B is a schematic perspective exploded view of the smart actuator of FIG. 11A;

FIG. 12 is a schematic perspective view of a damper assembly including the smart actuator of FIG. 11A;

DETAILED DESCRIPTION

Figure 5:
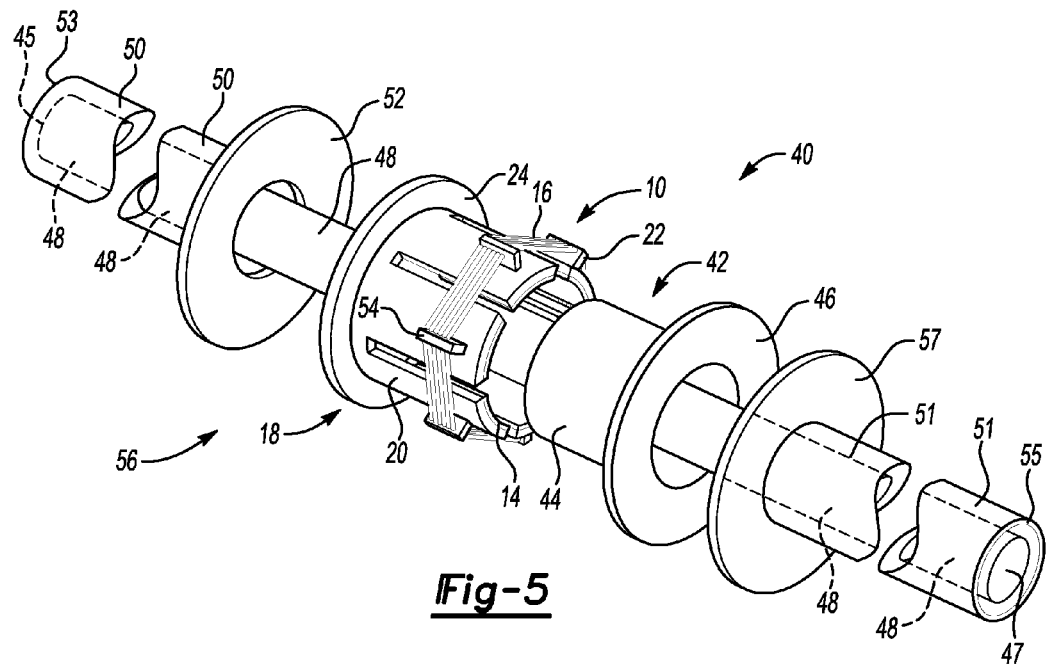
FIG. 5 is a partial schematic perspective view of a torsion bar assembly including a torque limiter assembly including a smart actuator.

Referring to the drawings wherein like reference numbers represent like components throughout the several figures, and beginning with FIG. 1A, a schematic perspective view of a smart actuator is generally indicated at 10, and is shown in exploded view in FIG. 1B. Actuator 10 includes, as shown in FIG. 1B, a generally cylindrical actuator body 18 which includes an actuable portion 20, shown in FIG. 1B as a plurality of actuable fingers 20 and a first attachment interface or support surface 24, which as shown is also configurable as a first spring seat 24. Each finger 20 defines a locating feature 22, which is adaptable for mounting or assembling shape memory alloy (SMA) wire 16 to actuator body 18. SMA wire 16 is, in the configuration shown, assembled to actuator body 18 such that SMA wire 16 is wrapped or wound in multiple turns or windings around actuable fingers 20 and around locating features 22 defined by fingers 20. SMA wire 16 is operatively connected to an actuating source, which may be, for example, an electrical circuit through which current may be provided to SMA wire 16 so as to actuate SMA wire 16 by elevating the temperature of SMA wire 16 through resistance heating. In a non-limiting example, SMA wire 16 may be operatively connected to a controller or switch which is responsive to at least one sensor, the at least one sensor responsive to at least one operating characteristic of the vehicle affecting suspension control and stability. The at least one sensor is adaptable to provide a signal to the switch or controller in response to a change in the operating characteristic, which may include a change in load transmitted through a system including actuator 10. Other methods of thermally actuating SMA wire 16 may be used, as would be understood by those skilled in the art.

SMA wire 16 may be of a length to be wrapped in a sufficient number of turns as required by the specific application, such that when actuated, SMA wire 16 exerts a force against features 22 on fingers 20 which causes radial compression of fingers 20 against friction pads 14. The outermost surface, e.g., the surface furthest away from the central axis of actuator 10, of each of friction pads 14 is located proximate to a corresponding inner diameter surface of finger 20. The outermost surface of each of friction pads 14 may be operatively attached to the inner surface of the corresponding finger 20, so as to retain friction pad 14 to finger 20 when actuator 10 is not in an actuated state. Friction pad 14 may be operatively attached by any suitable means known to those in the art, for example, by an adhesive or other bonding method. In an assembled configuration, the innermost surface of each friction pad 14 is located proximate to the outer diameter surface of a spring holder 12, which is generally cylindrical. When actuator 10 is non-actuated, a slidable interface is defined by outer diameter surface of spring holder 12 and the innermost surfaces of the plurality of friction pads 14. Spring holder 12 is configured as an interfacing member, e.g., spring holder 12 operatively interfaces with actuator body 18 to define a slidable interface. As will be discussed in further detail, when actuator 10 is non-actuated, spring holder 12 and actuator body 18 are configured such that spring holder 12 and actuator body 18 can move relative to each other.

Shown in FIG. 1C is a detailed view of SMA wires 16 wrapped circumferentially around locating features 22 on fingers 20. When current is supplied to SMA wires 16, the temperature of wires 16 rises due to resistance heating. This change in temperature results in phase transformation in the SMA material of wires 16, which in turn induces stress 26 in wires 16 as a result of constrained strain. Because of stress 26 in SMA wires 16, a resultant radially inward force 28 is exerted on each actuating finger 20. This radially inward force 28 pushes friction pads 14 against spring holder 12 (see FIG. 1B), thus inducing a proportional axial friction force. Once the resultant axial friction force (sum of all the components due to each friction pad) reaches a sufficient value, the sliding motion between spring holder 12 and friction pads 14 operatively attached to actuating fingers 20 is arrested such that relative movement between spring holder 12 and actuator body 18 is prevented. When actuator 10 is actuated, such that movement between spring holder 12 and actuator body 18 is arrested, a spring 36 operatively attached to spring holder 12 (see FIG. 2A) becomes activated, e.g., spring 36 becomes operational within spring assembly 30.

FIG. 2A is a schematic perspective view of a stiffness control device 30, which is shown as a spring assembly or actuator assembly 30. Spring assembly 30 may be incorporated as a stiffness element in, by way of non-limiting example, a damper, shock absorber, or material handling system for leveling or suspension of payloads. Spring assembly 30 includes smart actuator 10 of FIG. 1A, and further includes a main or primary spring 32 which is in operative communication with or operatively attached to or located in spring seat 24 at a first end, and which is in operative communication with or operatively attached to or located in a second attachment interface or support surface 34, which as shown is also configurable as a second spring seat 34. Main spring 32 is passive or continuously operational, e.g., main spring 32 reacts and responds to a load or loads imposed on spring assembly 30 such that main spring 32 extends or compresses in response to a load or change in load imposed on first and second attachment interfaces 24, 34 to provide a reactive spring force which dampens the imposed load. Further, main spring 32 is continuously operational by providing a response in the form of a reactive spring load independently of the activation state of actuator 10, e.g., main spring 32 responds continuously to changes in input load when actuator 10 is in an actuated state and when actuator 10 is in a non-actuated state.

A secondary or actuator spring 36 is in operative communication with or operatively attached to or located in spring holder 12 at a first end, and in operative communication with or operatively attached to or located in second spring seat 34 at a second end, and is activated by actuation of actuator 10. In a free state, actuator spring 36 is characterized by a free length. In an activated state, e.g., a compressed or an extended state, actuator spring 36 is characterized by an activated length, e.g., respectively, by a compressed length or an extended length. As would be understood, the spring force exerted by actuator spring 36 is proportional to the difference between its free length and its activated length.

FIG. 2B shows a cross-sectional illustration of section 2B-2B of the spring assembly of FIG. 2A. In a non-actuated state, e.g., when SMA wires are not at an elevated temperature, friction pads 14 do not restrain the movement of spring holder 12, such that as spring assembly 30 is subject to loading through first and second attachment interfaces 24, 34, spring holder 12 may slide within actuator body 18 and actuator spring 36 remains in a non-activated or free state, e.g., actuator spring 36 is neither extended nor compressed and as such does not exert a spring force against first and second attachment interfaces 24, 34. Therefore, when actuator 10 is in a non-actuated state, loads imposed on spring assembly 30 are responded to by a spring force from main spring 32 only, e.g., the total stiffness of spring assembly 30 is equal to the stiffness of main spring 32.

In an actuated state, as discussed previously, current is supplied to SMA wires 16 which when actuated exert a resultant radially inward force 28 on each actuating finger 20, pushing friction pads 14 in contact with spring holder 12. When sufficiently actuated, wires 16 exert sufficient force to cause friction pads 14 to arrest the sliding motion between spring holder 12 and friction pads 14 such that spring 36 becomes operational, e.g., spring 36 is activated or engaged such that the total stiffness of spring assembly 30 is equal to the sum of the stiffness of main spring 32 and the stiffness of actuator spring 36.

FIG. 3A schematically illustrates the spring force path of spring assembly 30 of FIGS. 2A and 2B. As shown, main spring or first stiffness element 32 is in operative communication with spring seats 24 and 34 and is continuously operational, such that when actuator 10 is non-actuated, main spring 32 passively, e.g., continuously, contributes the entire stiffness response of spring assembly 30. Additional stiffness response is selectively contributed when actuator 10 is actuated to restrain spring holder 12 against friction pads 14, (see FIG. 2B) so as to activate actuator spring or second stiffness element 36. When activated, actuator spring 36 also connects spring seats 24 and 34 such that the sum of the spring forces of main spring 32 and actuator spring 36 collectively contribute the entire stiffness response of spring assembly 30. The additional force path introduced by activated spring 36 can be engaged or disengaged with rapid deployment, e.g., within a few milliseconds, by actuating and de-actuating actuator 10, for example, using a controller communicating with and responding to input from one or more sensors sensing changes in loads imposed on spring assembly 30, or sensing, in a non-limiting vehicle example, indicators of vehicle stability such as changes in speed, steering angle, roll stability, etc. for which responsive changes in system stiffness may be required.

As shown in FIG. 3B, a stiffness mechanism 30 may be configured to include a plurality of n stiffness elements, each including an actuator 10 and an actuator spring 36, placed in combination with a main stiffness element 32 between first and second interfaces 24 and 34. Each actuator 10a through 10n may be operatively connected to an actuation source, for example, a controller, which can provide an actuating current to one or more actuators 10a through 10n. By configuring a plurality of actuable stiffness elements in parallel, in series, or in a combination of thereof, with a passive main or primary stiffness element, any one actuable stiffness element or a plurality of combinations of actuable stiffness elements may be activated at any time to provide a specific and refined response to input conditions, therefore enhancing the capability to respond to multiple variables and a broader scope of inputs.

By way of non-limiting example, FIG. 3B shows a main spring 32 in parallel with a plurality of n actuator springs 36 each in operative communication with a corresponding one of a plurality of n actuators 10. It would be understood that the plurality of n stiffness elements may include one or more stiffness elements configured with various types of smart actuators. For example, the plurality of stiffness elements may include one or more smart actuators 10 which comprise an actuating mechanism which may be one of a shape memory alloy (SMA), a magnetorheological (MR) fluid, an electrorheological (ER) fluid, a piezo-stack, a magnetic shape memory alloy (MSMA), a magnetostrictive material, or other smart material. The stiffness element may include a spring 10, or may be configured with another means to provide a resistive force, for example, an engageable coupling such as a torque limiter, clutch, or any other stiffness mechanism which can be activated by actuation of a smart actuator. The stiffness element may include other forms of engagement mechanisms, which may include mating elements such as gears, splines, ratchets, etc. Additionally, other forms of SMA material such as SMA ribbons, films or cables, SMA embedded composite materials and other SMA configurations, for example, powder metallurgy based SMA configurations, may be used in the configuration of a smart actuator 10.

The terms spring, torque limiter, coupling and clutch, as used herein, are intended to be representative and non-limiting. For example, the term spring refers generally to any object which can provide a force responsive to and opposing an input load, which may be metallic or non-metallic; and which may be configured as a coil spring, tension spring, leaf spring, or any other spring equivalent mechanism which can be configured to be activated by actuation of a smart actuator. It would be further understood that more than one passive stiffness element 32 may be placed in parallel with one or more actuable stiffness elements 36 between first and second interfaces 24 and 34 within the scope of this disclosure, and that one or more actuable stiffness elements 36 may be placed in parallel, in series or in a combination of series and parallel with each other. Alternatively, passive stiffness element 32 may be replaced by a stiffness element 36 including a smart actuator 10 such that each of the stiffness elements between first and second interfaces 24 and 34 may be activated individually or in combination, to configure a fully active stiffness control system, e.g., such that none of the stiffness elements are passively configured.

FIGS. 4A-4D show, generally indicated at 31, a stiffness mechanism generally configured as a strut assembly, which may be, by way of non-limiting example, a suspension strut assembly adaptable for use in a vehicle. Assembly 31 includes a damper 33, a main spring 32, a first spring seat 24, a second spring seat 34, an actuator spring 36, and an actuator spring holder 12 in operative communication with an actuator 10. Main spring 32 is in operative communication with or operatively attached to or located in, at a first end, spring seat 24, and at a second end, spring seat 34. Damper 33, which may also be referred to as a shock absorber, includes a damper cylinder or body 38 which is in operative communication with a damper rod 39 such that damper 33 may provide a resistive or dampening force to forces inputted to assembly 31 through damper ends 25, 35. Damper rod 39, which may also be referred to as a piston rod or cylinder rod is connected at one end to a first damper end 25, which may be adapted to be operatively connected to, for example, a portion of a vehicle body, chassis or suspension. First damper end 25 is proximate to first spring seat 24 and may be operatively attached to seat 24. First spring seat 24 may be further configured such that rod 39 extends through an opening in seat 24. Damper body 38 defines a second damper end 35, which may be adapted to be operatively connected to, for example, a portion of a vehicle body, chassis or suspension. Damper body 38 is in operative communication with second spring seat 34, which may be operatively or fixedly attached to damper body 38. Damper 33 including damper ends 25, 35, spring seats 24, 34 and main spring 32 are therefore collectively configurable as a conventional strut assembly, which may also be referred to as a coilover, as a coil over shock, or as a coilover shock assembly, as those terms are understood by one skilled in the art. Loads are inputted to damper ends 25, 35 from changes in vehicle operating conditions, for example, by turning, cornering, steering, braking or other maneuvers affecting suspension to wheel configuration and/or vehicle stability including vehicle roll and yaw, changes in tire to road contact caused by variations in road surface such as crowning, potholes, surface slickness or roughness, or other changes in vehicle condition resulting in load input to damper ends 25, 35. Loads input into damper ends 25, 35 are responded to or countered by extension and compression of main spring 32 and by extension and contraction of rod 39 in damper 33, as would be understood for a conventional coilover assembly.

Actuator spring 36 is in operative communication at a first end with first spring seat 24 and at a second end with spring holder 12. Actuator 10 is in operative communication with spring holder 12. Actuator 10, spring holder 12 and damper body 38 are configured such that, when actuator 10 is in a non-actuated state, spring holder 12 moves slidably along the axis of assembly 31 and proximate to actuator 10 and damper body 38 when assembly 31 is subject to loading through first and second damper ends 25, such that actuator spring 36 remains in a non-activated or free state, e.g., actuator spring 36 is neither extended nor compressed and as such does not exert a spring force responsive to loads inputted through first and second damper ends 25, 35. Therefore, when actuator 10 is in a non-actuated state, the total stiffness response (resisting force) of assembly 31 is equal to the stiffness of main spring 32 and the stiffness of damper 33.

Further, when actuator 10 is in a non-actuated state, assembly 31 responds to loads inputted through first and second damper ends 25, 35 as would a conventional coil over shock assembly, e.g., inputted loads are resisted and/or dampened by a responsive passive spring force from main spring 32 and a passive dampening force from damper 33, which are each proportional to a change in the overall length (OAL) of main spring 32 responsive to the inputted loads. For example, when assembly 31 is subjected to tensile loading as indicated by the directional arrows at ends 25 and 35 shown in FIGS. 4A and 4B, the OAL of main spring 32 responsively increases to an extended length (EL) indicated in FIGS. 4A and 4B as $EL_1$. When assembly 31 is subjected to compressive loading as indicated by the directional arrows at ends 25 and 35 shown in FIGS. 4C and 4D, the OAL of main spring 32 responds by decreasing to a compressed length (CL) indicated in FIGS. 4C and 4D as $CL_1$.

When actuator 10 is non-actuated such that actuator spring 36 is in a free state, actuator spring 36 is characterized by a free length (FL) indicated in FIGS. 4A and 4C as $FL_2$. When actuator 10, which includes an actuation mechanism comprising a smart material is actuated, as discussed previously for spring assembly 30 related to FIG. 2A and by way of a non-limiting example, by a current supplied to the smart material in actuator 10, actuator 10 exerts a force on spring holder 12 which causes the sliding motion of spring holder 12 to be arrested, such that spring holder 12 moves in conjunction with damper body 38, and spring 36 becomes activated and operational, e.g., spring 36 is engaged such that the total stiffness response of spring assembly 31 is equal to the sum of the stiffness response of main spring 32, the stiffness response of damper 33 and the stiffness response of the activated actuator spring 36.

In an activated state, which may be, for example, a compressed or an extended state, actuator spring 36 is characterized by an actuated length, which may be a compressed length (CL) or an extended length (EL), respectively, indicated in FIGS. 4A-4D as $CL_2$ and $EL_2$, respectively. As would be understood, the responsive spring force exerted by actuator spring 36 when activated is proportional to the difference between its free length and its activated length, e.g., the spring force is proportional to $|FL_2-EL_2|$ when actuator spring 36 is activated and extended, and is proportional to $|FL_2-CL_2|$ when actuator spring 36 is activated and compressed. Further, the activated length of actuator spring 36 is proportional to the OAL of main spring 36. When actuator 10 is actuated and spring 36 is activated, $EL_2$ of main spring 32 is proportional to $EL_1$ of actuator spring 32 when assembly 31 is extended by loads inputted to ends 25, 35, and $CL_2$ is proportional to $CL_1$ when assembly 31 is compressed by loads inputted to ends 25, 35.

FIGS. 4A-4D show assembly 31 in various states of loading and actuation. FIG. 4A shows assembly 31 loaded in tension as indicated by the arrows at ends 25, 35, and further shows actuator 10 in a non-actuated state. Assembly 31 has responded to tensile loading by extending main spring 32 such that main spring 32 resists the inputted tensile load to provide ride stability and maintain wheel to road contact. Concurrently, damper 33 responds to tensile loading of assembly 31 by extending rod 39 away from damper body 38, wherein damper 33 may be further configured with valving or other dampening mechanisms such that damper 33 also resists the inputted tensile load and dampens the transmission of the inputted loads through assembly 31 to improve ride comfort and stability. Actuator 10 is in a non-actuated state and therefore spring holder 12 is not constrained and is sliding such that actuator spring 36 is not activated or engaged and maintains a free length $FL_2$ as main spring 32 and rod 39 extend. As shown in FIG. 4A, the total stiffness of spring assembly 31 is equal to the sum of the stiffness of main spring 32 and the stiffness of damper 33.

FIG. 4B shows assembly 31 of FIG. 4A with actuator 10 in an actuated state, such that actuator 10 has exerted a radial load on spring holder 12 to operatively restrain or arrest spring holder 12 between actuator 10 and damper body 38 so that spring holder 12 moves with the relative movement of damper body 38 away from spring seat 34 as rod 39 is extended in response to tensile loading of ends 25, 35. Actuator spring 36, which is operatively attached to spring holder 12 and spring seat 34, is activated and made operational by the arrested movement of spring holder 12 and extends to provide a resistive and dampening force in response to tensile loading of ends 25, 35. As shown in FIG. 4B, the total stiffness response of spring assembly 31 is equal to the sum of the stiffness of main spring 32, the stiffness of damper 33 and the stiffness of the activated actuator spring 36 when actuator 10 is actuated. Actuator 10 may be actuated, for example, in response to input from one or more vehicle sensors to a controller or switch operatively connected to actuator 10, thereby providing additional stability control of the vehicle responsive to the conditions which have induced the tensile loading of assembly 31.

FIG. 4C shows assembly 31 loaded in compression as indicated by the arrows at ends 25, 35, and further shows actuator 10 in a non-actuated state. Assembly 31 has responded to compressive loading by compressing main spring 32 such that main spring 32 resists the inputted compressive load to provide ride stability and maintain tire to road contact. Concurrently, damper 33 responds to the compressive loading of assembly 31 by contraction of rod 39 into damper body 38, wherein damper 33 may be further configured with valving or other dampening mechanisms such that damper 33 also resists the compressive load and dampens transmission of the compressive loads through assembly 31 to improve ride comfort and stability. Actuator 10 is in a non-actuated state and therefore spring holder 12 is not constrained and sliding such that actuator spring 36 is not engaged and maintains a free length $FL_2$ as main spring 32 compresses and rod 39 contracts. As shown in FIG. 4C, the total stiffness response of spring assembly 31 is equal to the sum of the stiffness of main spring 32 and the stiffness of damper 33.

FIG. 4D shows assembly 31 of FIG. 4B with actuator 10 in an actuated state, such that actuator 10 has exerted a radial load on spring holder 12 to operatively restrain or arrest spring holder 12 between actuator 10 and damper body 38 so that spring holder 12 moves with the relative movement of damper body 38 toward spring seat 34 as rod 39 is contracted into damper body 38 in response to compressive loading of ends 25, 35. Actuator spring 36, which is operatively attached to spring holder 12 and spring seat 34, is activated and made operational by the arrested movement of spring holder 12 and compresses to provide a resistive and dampening force to compressive loading of ends 25, 35. As shown in FIG. 4D, the total stiffness of spring assembly 31 is equal to the sum of the stiffness of main spring 32, the stiffness of damper 33 and the stiffness of the activated actuator spring 36 when actuator 10 is actuated. Actuator 10 may be actuated, for example, in response to input from one or more vehicle sensors to a controller or switch operatively connected to actuator 10, thereby providing additional stability control of the vehicle responsive to the conditions which have induced the compressive loading of assembly 31.

During vehicle operation, assembly 31 may be dynamically loaded, unloaded and reloaded in compression and tension and at varying loads due to dynamically changing vehicle characteristics and operating conditions. One or more sensors in operative communication with a controller or other means adaptable to actuate actuator 10 can be configured such that actuator 10 can be dynamically actuated and de-actuated, as shown in FIGS. 4A-4D, to activate and de-activate spring 36 thereby selectively and dynamically providing additional stiffness to assembly 31, e.g., with activation response times in a few milliseconds. By doing so, dynamic management of stiffness control and vehicle stability during vehicle operation can be enhanced and improved.

Figure 6:
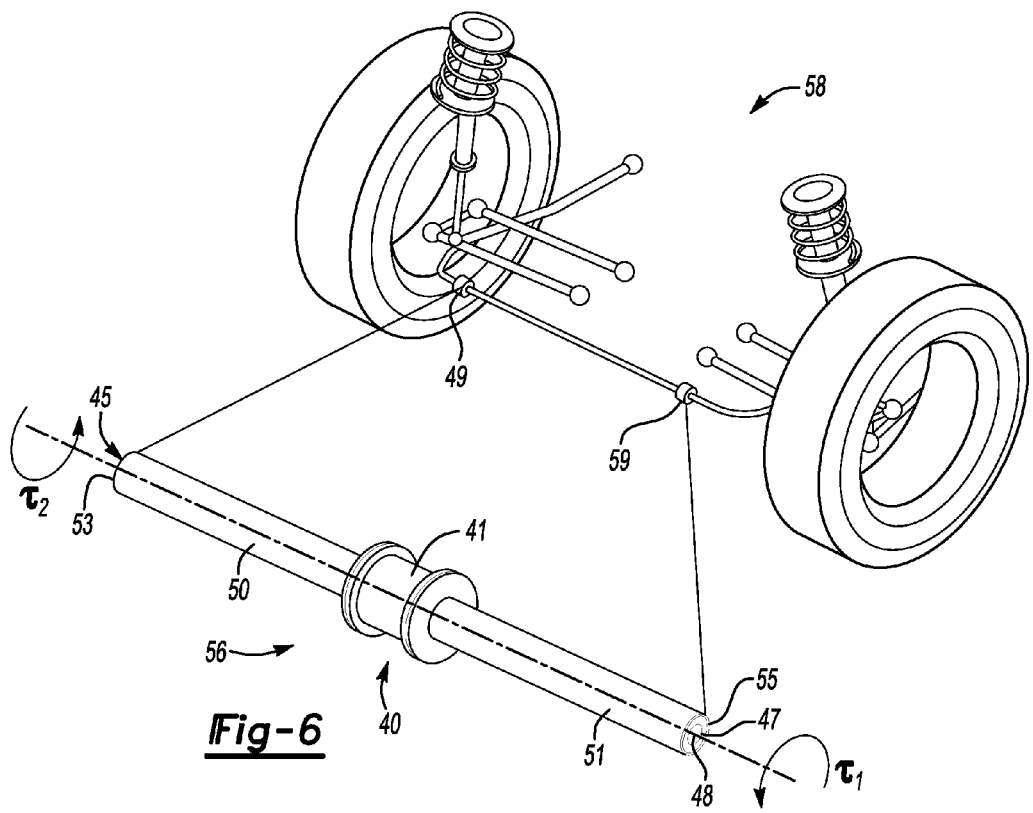
FIG. 6 is a schematic perspective view of a suspension assembly including the torsion bar assembly of FIG. 5.

FIG. 5 shows a partial view of a torsion bar assembly generally indicated at 56, which may be in a non-limiting example adaptable for use in a vehicle suspension module 58 shown in FIG. 6. Torsion bar assembly 56, which may also be referred to as an anti-roll bar assembly, includes a primary or inner torsion bar 48, which is operatively connected or attached at a first end 45 to a first suspension interface 49, and which is operatively connected or attached at a second end 47 to a second suspension interface 59, such that in a vehicle suspension module 58 shown in FIG. 6, primary or inner torsion bar 48 operates as a conventional torsion bar, as that term would be commonly understood, and as such is configured to passively and continuously respond to changes in loads input through suspension interfaces 49, 59 into respective ends 45, 47 of inner torsion bar 48, where the changes in input loads are attributable to changes in vehicle characteristics and operating conditions. Inner torsion bar 48 responds to these input loads by twisting or deflecting in opposing moments $\tau_1$ at one end and $\tau_2$ at the other end of inner torsion bar 48 to affect the roll stiffness of the vehicle. It would be understood that under certain input loading conditions, opposing moments $\tau_1$ and $\tau_2$ may each be in a direction opposite to the direction shown in FIG. 6, such that the ends of inner torsion bar 48 twist or deflect in the opposite direction. It would be further understood that opposing moments $\tau_1$ and $\tau_2$ may each be of different magnitudes including a magnitude of zero, attributable to differences in the magnitude and character of the load input at interface 49 in comparison to the load input at interface 59, such that the neutral point along the axis of inner torsion bar 48 where the resultant of the opposing moments is zero, may be located at end point along the axis of inner torsion bar 48, including at either end 45, 47. Further, it is understood that primary torsion bar 48 continuously responds to changes in input loads by twisting or deflecting in response to the input loads independently of the state of actuation of actuator 10, e.g., primary torsion bar 48 responds continuously to changes in input load whether actuator 10 is non-actuated or whether actuator 10 is in an actuated state.

Torsion bar assembly 56 further defines a secondary torsion bar comprised of a stiffness element or smart actuator assembly generally indicated at 40 and configured to selectively connect a first outer torsion bar 50 and a second outer torsion bar 51 when actuated. Outer torsion bars 50, 51 may also be referred to as outer half-shafts 50, 51 or as first and second torsion bar segments 50, 51, respectively, and may be, but are not required to be, configured such that they are substantially similar to or mirror images of each other. Torsion bar assembly 56 may further include a cover or housing 41 to seal or protect actuator assembly 40, for example, from contaminants such as road dirt or water during operation on a vehicle. Housing 41 may be of a generally cylindrical configuration, as shown in FIG. 6, or may be otherwise configured to operatively encase or seal actuator assembly 40.

As shown in FIG. 5, actuator assembly 40, which may also be referred to as a coupling, a torque limiter, or torque limiting device 40, includes an actuator 10 and bushing 42. Bushing 42, which may also be referred to as a hub, drive hub or flanged bushing, defines a second attachment interface or flange 46 and a generally cylindrical interface 44 which may also be referred to as a bearing surface or clutch face 44. Flange 46 is configured to operatively attach or be connected to an attachment portion 57 of second outer torsion bar 51 when assembled into torsion bar assembly 56. The outermost end 55 of second outer torsion bar 51 is operatively connected or attached to suspension interface 59, such that end 55 and end 47 are operatively connected to suspension interface 59 in sufficiently coincident or proximate locations such that end 55 and end 47 are subjected to substantially equivalent load input through suspension interface 59. Alternatively, end 55 of second outer torsion bar 51 may be operatively connected to end 47 of inner torsion bar 48 such that load input from or through suspension interface 59 is input coincidentally and substantially equivalently to ends 47 and 55.

Actuator 10 includes, as shown in FIG. 5, a generally cylindrical actuator body 18 which includes actuable fingers 20 and a first attachment interface or support surface 24. First attachment interface 24 is configured to operatively attach or be connected to an attachment portion 52 of first outer torsion bar 50 when assembled into torsion bar assembly 56. The outermost end 53 of first outer torsion bar 50 is operatively connected or attached to suspension interface 49, such that end 53 and end 45 are operatively connected to suspension interface 49 in sufficiently coincident or proximate locations such that end 53 and end 45 are subjected to substantially equivalent load input from or through suspension interface 49. Alternatively, end 53 of first outer torsion bar 50 may be operatively connected to end 45 of inner torsion bar 48 such that load input through suspension interface 49 is input coincidentally and substantially equivalently to ends 45 and 53.

Actuator 10 further includes a plurality of friction pads 14. The outermost surface of each of friction pads 14, e.g., the friction pad surface furthest away from the central axis of actuator 10, is located proximate to a corresponding inner diameter surface of a finger 22 of actuator body 18. The outermost surface of each of friction pads 14 may be operatively attached to the inner surface of the corresponding finger 22, so as to retain friction pad 14 to finger 22 when actuator 10 is not in an actuated state. Friction pads 14 may be operatively attached by any suitable means known to those in the art, for example, by an adhesive or other bonding method, or by a fastener or other mechanical means. In an assembled configuration, the innermost surface of each friction pad 14, e.g., the surface of friction pad 14 closest to the central axis of actuator 10 and which defines a portion of the inner surface of actuator 10, is located proximate to interface surface 44 of bushing 42. A slidable interface, which may also be described as a rotatable interface, is defined between interface surface 44 and the innermost surfaces of friction pads 14 when assembled in torsion bar assembly 56 and with actuator 10 in a non-actuated state.

Further, as shown in FIGS. 5 and 6, the inner surfaces of outer torsion bars 50, 51 with the inner surface of bushing 42 define, in an assembled configuration, a generally cylindrical cavity of a length substantially equal to the length of inner torsion bar 48, and of a cross sectional configuration such that inner torsion bar 48, which is located within the generally cylindrical cavity, may twist or deflect in response to input loads transmitted through interfaces 49 and 59.

As discussed previously, end 55 and end 47 are subjected to substantially equivalent load input through suspension interface 59. Also discussed previously, end 53 and end 45 are subjected to substantially equivalent load input through suspension interface 49. Therefore, when input loads are transmitted through interfaces 49 and 59, inner torsion bar 48 and outer torsion bars 50 and 51 twist or deflect in response. When actuator 10 is in a non-actuated condition, first outer torsion bar 50 and second outer torsion bar 51 are operatively disconnected by the sliding interface defined between interface surface 44 and friction pads 14 of actuator 10, such that first outer torsion bar 50 and second outer torsion bar 51 move independently of each other in response to their respective input loads.

As shown in FIG. 5, fingers 20 of actuator body 18 define a plurality of locating features 22, which are adaptable for mounting or assembling shape memory alloy (SMA) wire 16 to actuator body 18. SMA wire 16 is, in the configuration shown, assembled to actuator body 18 such that SMA wire 16 is wrapped in multiple turns around actuable fingers 20 and around locating features 22 defined by fingers 20. Feature 22 may be configured to include or define a spacing feature 54, which may be used to maintain clearance between SMA wire 16 and a housing or cover 41 encasing actuator assembly 40 (see FIG. 6). SMA wire 16 is operatively connected to an actuating source, which may be, for example, an electrical circuit through which current may be provided to SMA wire 16 so as to actuate SMA wire 16 by elevating the temperature of SMA wire 16 through resistance heating. In a non-limiting example, SMA wire 16 may be operatively connected to one or more sensors or switches, or to a controller which is responsive to at least one sensor, where the at least one sensor is sensing an operating characteristic of the vehicle affecting suspension control and stability, which may be, for example, a load inputted into or through the suspension system, and providing a signal to the wire, switch or controller in response to changes in the operating characteristic or load being sensed. Other methods of thermally actuating SMA wire 16 may be employed, as would be understood by those skilled in the art.

SMA wire 16 may be of a length to be wrapped in a sufficient number of turns as required by the specific application, such that when actuated, SMA wire 16 exerts a force against features 22 on fingers 20 which causes the radial compression of fingers 20 against friction pads 14, as discussed previously for FIGS. 1A-1C. When actuator 10 is actuated, the resultant radially inward force exerted by actuated SMA wire 16 on each actuating finger 20 pushes friction pads 14 against interface 44 of bushing 42.

Once the resultant axial friction force reaches a sufficient value, motion between bushing 42 and friction pads 14 operatively attached to actuating fingers 20 is arrested, closing or eliminating the sliding interface between bushing 42 and friction pads 14 such that actuator 10 and bushing 42 move together and are operatively connected as a single unit in response to input loads transmitted from interfaces 49, 59 through outer torsion bars 50, 51 to actuator assembly or torque limiter 40. When actuated such that actuator 10 and bushing 42 become operatively connected, outer torsion bars 50, 51 and actuator assembly 40 operatively define a single outer torsion bar, which may also be referred to as a secondary torsion bar which, in the non-limiting example shown in FIG. 5, is coaxial with inner torsion bar 48 and is of a length substantially equal to the length of inner torsion bar 48, such that when input loads are transmitted through interfaces 49 and 59, both the primary (inner) torsion bar 48 and the secondary torsion bar defined by bars 50, 51 and actuator assembly 40 twist or deflect in response to the inputted loads, thereby providing additional stiffness control and capability to affect and control roll stability.

FIG. 6 shows a vehicle suspension module configured with the torsion bar assembly of FIG. 5. When one of the wheels tries to move independently with respect to the other, input loads are transmitted through interfaces 49, 59 and torsion bar assembly 56 experiences twisting or deflection. When actuator assembly 40 is non-actuated, outer torsion bars 50, 51 move independently of each other and with respect to the slidable or rotatable interface defined between the non-actuated friction pads 14 of actuator 10 and interface 44 of bushing 42, such that the input loads and twisting or deflection of torsion bar assembly 56 is resisted solely by inner torsion bar 48. When actuator assembly 40 is actuated, for example, by a current from a controller receiving a signal from one or more vehicle sensors, outer torsion bars 50, 51 become operatively connected when friction pads 14 of actuator 10 compress against interface 44 of bushing 42 to arrest the sliding or rotating motion between outer torsion bars 50, 51 thereby closing or eliminating the sliding interface. When outer torsion bars 50, 51 become operatively connected by activation of stiffness element 40, the outer torsion bars 50, 51 become operational to resist twisting and deflection of torsion bar assembly 56, e.g., the operatively connected outer torsion bars 50, 51 respond to the loads inputted to torsion bar assembly 56. By controlling the current supplied to actuator 10, the slip, e.g., the slidable interface, between first and second outer torsion bars 50, 51 can be controlled thus providing additional on-demand torsion control and dynamically changing the overall torsional resistance of anti-roll bar assembly 56.

Suspension assembly 58 shown in FIG. 6 may include multiple stiffness elements configured with smart actuators which may be used to dynamically deploy additional on-demand stiffness in stiffness control systems, including vehicle stability control systems, by dynamically activating and de-activating the stiffness elements response to changes in input loading and vehicle stability conditions. For example, suspension assembly 58 may be configured to include a smart actuated anti-roll bar assembly 56, one or more smart actuated coilover or strut assemblies, such as assembly 31 (see FIGS. 4A-4D), and one or more linkages each including, for example, a smart actuator 10 (see FIG. 1A) or smart actuator assembly 20 (see FIG. 2A). By using one or more stiffness elements which can be configured with smart actuators and incorporated into stability control systems, vehicle handling and stiffness control can be improved with minimal compromise in ride comfort, and vehicle roll-performance can be enhanced by providing on-demand coupling or decoupling of the smart stiffness elements through on-demand actuation of their respective actuators. In a non-limiting example, a chassis system configured with torsion bar assembly 56 and coilover assemblies 31 demonstrated enhanced roll-performance and the capability to deploy additional stiffness on-demand so as to improve the ride and handling performance of the vehicle so configured. Preliminary simulations using the representative configuration with a full-car model show improvement in roll gradient from 5.89 deg/g to 3.85 deg/g and understeer gradient from 4.06 deg/g to 0.99 deg/g metrics.

Smart actuators present advantages over existing hydraulic and motor based systems including reduced cost, complexity and packaging space. Multiple stiffness elements with smart actuators may be placed in parallel or series or a combination thereof to further increase the range of stability and stiffness control possible, and increase implementation options. The smart actuators discussed previously have been described, in non-limiting examples, as smart actuators comprising SMA actuating elements defined as SMA wire 16. As would be understood, the smart actuators discussed herein may comprise other configurations of SMA material such as SMA ribbon, SMA film, SMA cable, SMA embedded composite materials, and configurations formed from SMA bulk materials such as SMA powder metal. As would also be understood, the smart actuators may use alternative constructions and other forms of engagement mechanisms such as gears, splines, ratchets, etc. Other smart materials and smart actuating elements may be used, including but not limited to magnetorheological (MR) fluids, electrorheological (ER) fluids, piezo-elements including piezo-stacks, magnetic shape memory alloys (MSMA) and magnetostrictive materials. In additional to the advantages previously discussed, the system and apparatus provided herein can accommodate rapid changes in stiffness, for example, within a few milliseconds. The range of stiffness control and rapid response time allows vehicle handling to be improved without compromising ride comfort. Understeer characteristics can be influenced by controlling roll moment distribution between front and rear axles. Road holding in off-road driving conditions can also be improved.

FIG. 7 shows an alternative construction of a smart actuator assembly generally indicated at 60. Actuator assembly 60, which may also be referred to as a torque limiting assembly or coupling 60, includes an actuator 61 and bushing 62. Bushing 62, which may also be referred to as a hub, drive hub or flanged bushing, defines a generally cylindrical interface 64 which may also be referred to as a bearing surface or clutch face 64 and a second attachment interface or flange 66. Flange 66 is configured to operatively attach or be connected to an attachment portion 57 of second outer torsion bar 51 when assembled into torsion bar assembly 56 (see FIG. 5). Bushing 62 may be additionally configured to as a housing or cover for actuator assembly 60, to seal or protect assembly 60 and actuator 61 from contamination by, for example, road dirt, moisture or other contaminants.

Actuator 61 includes, as shown in FIGS. 7, 8A and 8B, a generally cylindrical actuator body 68 which includes actuable fingers 70 and a first attachment interface or support surface 78. First attachment interface 78 is configured to operatively attach or be connected to an attachment portion 52 of first outer torsion bar 50 when assembled into torsion bar assembly 56 (see FIG. 5). First and second torsion bars 50, 51 are operatively connected to suspension interfaces 49, 59 as previously discussed for FIGS. 5 and 6.

Actuator 61 further includes a spring retainer 74 and a plurality of friction pads 72. The innermost surface of each friction pad 72, e.g., the friction pad surface closest to the central axis of actuator 61, is located proximate to a corresponding outer diameter surface of a finger 70 of actuator body 68. The innermost surface of each friction pad 72 may be operatively attached to the outer surface of the corresponding finger 70, so as to retain friction pad 72 to finger 70 when actuator 61 is not in an actuated state. Friction pad 72 may be operatively attached by any suitable means known to those in the art, for example, by an adhesive or other bonding method, or by a fastener or other mechanical means. In an assembled configuration, the outermost surface of each friction pad 72, e.g., the friction pad surface farthest from the central axis of actuator 61 and which defines a portion of the outer surface of actuator 61, is located proximate to interface surface 64 of bushing 62. A slidable interface, which may also be described as a rotatable interface, is defined between interface surface 64 and the outermost surfaces of friction pads 72 when assembled in torsion bar assembly 56 and with actuator 61 in a non-actuated state.

As discussed previously for FIG. 6, when input loads are transmitted through interfaces 49 and 59, outer torsion bars 50 and 51 twist or deflect in response. When actuator 61 is in a non-actuated condition, first outer torsion bar 50 and second outer torsion bar 51 are operatively disconnected by the slidable or rotatable interface between interface surface 64 and friction pads 72 of actuator 61, such that first outer torsion bar 50 and second outer torsion bar 51 may move independently of each other in response to their respective input loads.

Figure 8C:
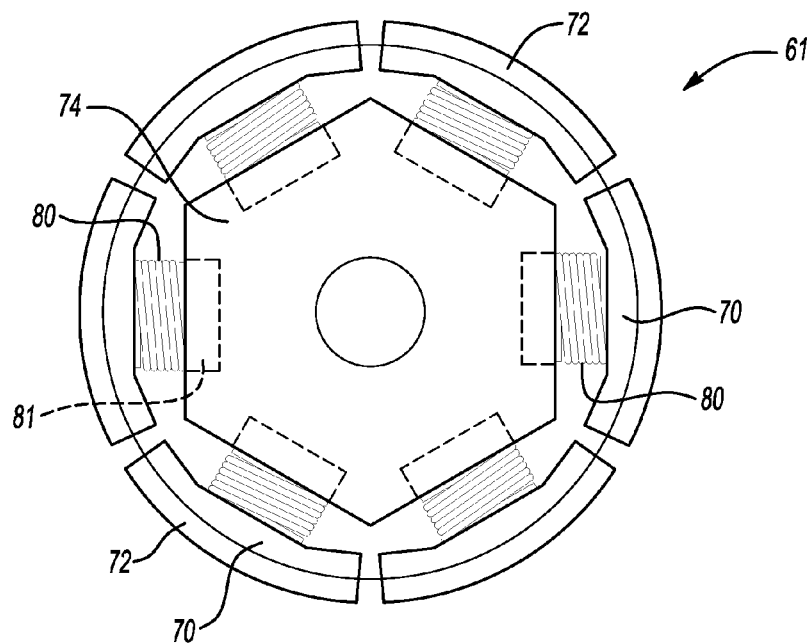
FIG. 8C is a schematic cross-sectional illustration of section 8C-8C of the smart actuator of FIG. 8A.

As shown in FIGS. 8B and 8C, spring retainer 74 defines a plurality of locating features 81, which may also be referred to as spring pockets, which are each adaptable to locate or retain a spring 80 in spring retainer 74. A spring 80 is, in the configuration shown, retained in each spring pocket 81 of retainer 74 such that each spring 80 is in proximate contact with the interior surface of an actuating finger 70. Springs 80 are fabricated from a shape memory alloy (SMA). The plurality of SMA springs 80 are operatively connected to an actuating source, which may be, for example, an electrical circuit through which current may be provided to the plurality of SMA springs 80 so as to actuate springs 80 by elevating the temperature of the plurality of SMA springs 80 through resistance heating. In a non-limiting example, SMA springs 80 may be operatively connected to a controller which is responsive to at least one sensor, the at least one sensor responsive to at least one operating characteristic of the vehicle affecting suspension control and stability. Other methods of thermally actuating SMA springs 80 may be employed, as would be understood by those skilled in the art.

SMA spring 80 may be comprised of a sufficient number of coils and of an SMA wire of sufficient cross-sectional area as required by the specific application, such that when actuated, each SMA spring 80 expands so as to exert a radially outward force against fingers 70 causing the radial expansion of fingers 70 against friction pads 72. As shown in FIG. 8C, when actuator 61 is actuated, the resultant radially outward force exerted by each actuated SMA spring 80 on an actuating finger 70 pushes friction pads 72 against interface 64 of bushing 62. Once the resultant axial friction force reaches a sufficient value, motion between bushing 62 and friction pads 72 operatively attached to actuating fingers 70 is arrested, eliminating the slidable interface between bushing 62 and friction pads 72 such that actuator 61 and bushing 62 move together and are operatively connected as a single unit in response to input loads transmitted from interfaces 49, 59 through outer torsion bars 50, 51 to actuator assembly 60. When actuated such that actuator 61 and bushing 62 become operatively connected, outer torsion bars 50, 51 and actuator assembly 60 operatively define a single outer, or secondary, torsion bar which is coaxial with inner torsion bar 48 and is of a length substantially equal to the length of inner torsion bar 48, such that when input loads are transmitted through interfaces 49 and 59, both the primary (inner) torsion bar 48 and the secondary torsion bar defined by bars 50, 51 and actuator assembly 60 twist or deflect to provide a combined response to the input loads, thereby providing additional stiffness control and capability to affect roll stability, as discussed for FIG. 6.

Figure 9:
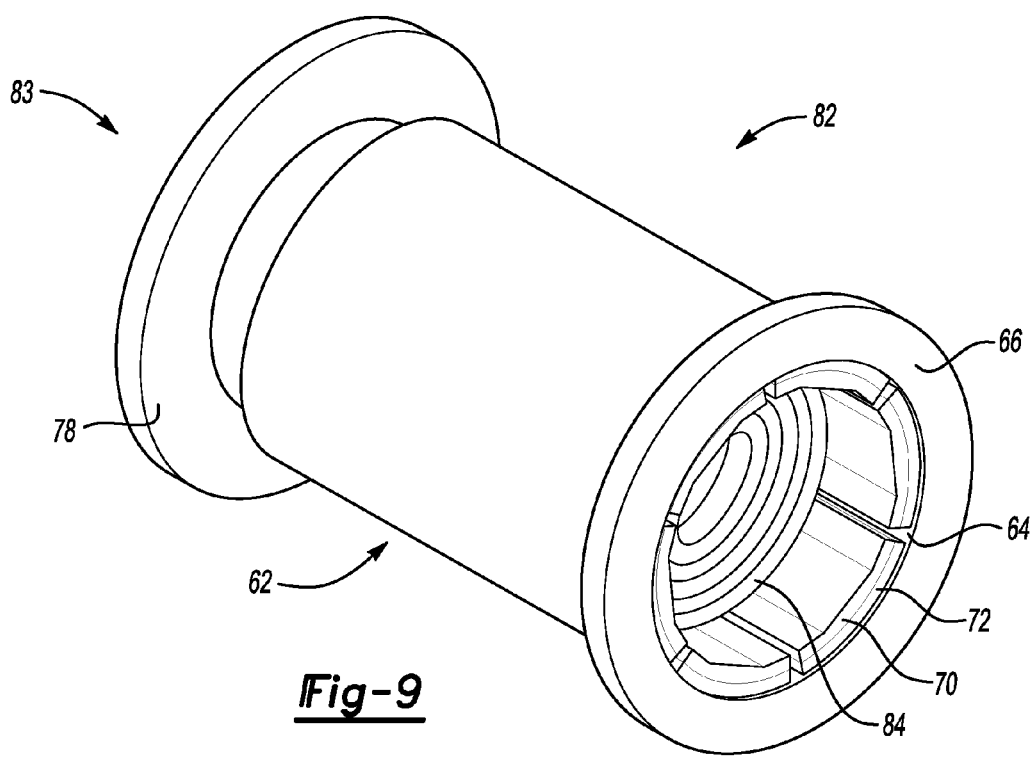
FIG. 9 is a schematic perspective view of the torque limiter assembly of FIG. 6 including an alternative construction of a smart actuator.

FIG. 9 shows an alternative construction of a smart actuator assembly generally indicated at 82. Actuator assembly 82, which may also be referred to as a torque limiting device or as a coupling, includes an actuator 83 and bushing 62. Bushing 62, which may also be referred to as a hub or flanged bushing, defines a generally cylindrical interface 64 which may also be referred to as a bearing surface or clutch face 64 and a second attachment interface or flange 66. Flange 66 is configured to operatively attach or be connected to an attachment portion 57 of second outer torsion bar 51 when assembled into torsion bar assembly 56 (see FIG. 5). Bushing 62 may be additionally configured to as a housing or cover for actuator assembly 82, to seal or protect assembly 82 and actuator 83 from contamination by, for example, road dirt, moisture or other contaminants.

Figure 10A:
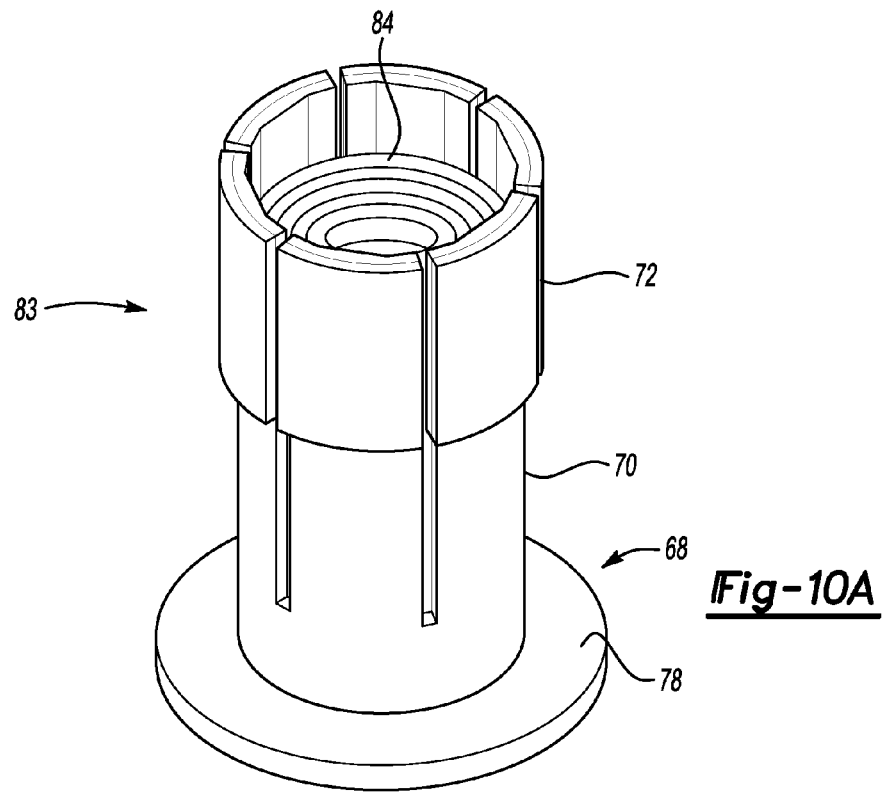
FIG. 10A is a schematic perspective view of the smart actuator of FIG. 9.
Figure 10B:
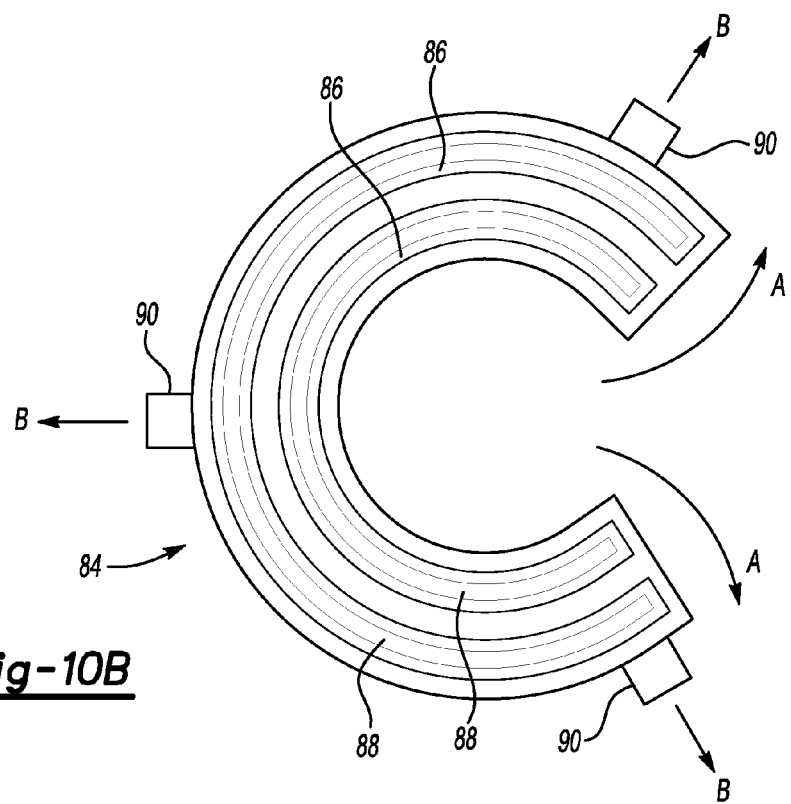
FIG. 10B is a schematic top view of the actuating mechanism of the smart actuator of FIG. 10A.

Actuator 83 includes, as shown in FIGS. 9, 10A and 10B, a generally cylindrical actuator body 68 which includes actuable fingers 70 and a first attachment interface or support surface 78. First attachment interface 78 is configured to operatively attach or be connected to an attachment portion 52 of first outer torsion bar 50 when assembled into torsion bar assembly 56 (see FIG. 5). First and second torsion bars 50, 51 are operatively connected to suspension interfaces 49, 59 as previously discussed for FIGS. 5 and 6.

Actuator 83 further includes an actuating mechanism 84, which is generally C-shaped such that actuating mechanism 84 is adaptable to be located coaxially within the inner diameter of generally cylindrical actuator body 78. Actuator 83 includes a plurality of friction pads 72. The innermost surface of each friction pad 72, e.g., the surface of friction pad 72 closest to the central axis of actuator 83, is located proximate to a corresponding outer diameter surface of a finger 70 of actuator body 68. The innermost surface of each friction pad 72 may be operatively attached to the outer surface of the corresponding finger 70, so as to retain friction pad 72 to finger 70 when actuator 83 is not in an actuated state. Friction pad 72 may be operatively attached by any suitable means known to those in the art, for example, by an adhesive or other bonding method, or by a fastener or other mechanical means. In an assembled configuration, the outermost surface of each friction pad 72, e.g., the friction pad surface farthest from the central axis of actuator 61 and which defines a portion of the outer surface of actuator 83 is located proximate to interface surface 64 of bushing 62. A slidable interface, which may also be described as a rotatable interface, is defined between interface surface 64 and the outermost surfaces of friction pads 72 when assembled in torsion bar assembly 56 and with actuator 83 in a non-actuated state.

As discussed previously for FIG. 6, when input loads are transmitted through interfaces 49 and 59, outer torsion bars 50 and 51 twist or deflect in response. When actuator 83 is in a non-actuated condition, first outer torsion bar 50 and second outer torsion bar 51 are operatively disconnected by the slidable interface between interface surface 64 and friction pads 72 of actuator 83, such that first outer torsion bar 50 and second outer torsion bar 51 may move independently of each other in response to their respective input loads.

As shown in FIGS. 10A and 10B, actuating mechanism 84 defines a plurality of locating features 86, which may also be referred to as grooves or recesses, which are each adaptable to locate or retain a wire 88. Actuating mechanism 84 further defines a plurality of protuberances 90, which may also be referred to as protrusions, tabs or extensions, which are each in proximate contact with the interior surface of an actuating finger 70. Wires 88 are fabricated from a shape memory alloy (SMA) and may have a cross-section of sufficient size and configuration as required by the specific application. The plurality of SMA wires 88 are operatively connected to an actuating source, which may be, for example, an electrical circuit through which current may be provided to the plurality of SMA wires 88 so as to actuate wires 88 by elevating the temperature of the plurality of SMA wires 88 through resistance heating. In a non-limiting example, SMA wires 88 may be operatively connected to a sensor, a switch or a controller which is responsive to at least one sensor, the at least one sensor responsive to at least one operating characteristic of the vehicle affecting suspension control and stability, as discussed previously. Other methods of thermally actuating SMA wires 88 may be employed, as would be understood by those skilled in the art.

SMA wires 88 are configured and operatively assembled within grooves 86 or attached to the generally C-shaped housing of mechanism 84 such that when actuated, each SMA wire 88 expands so as to cause each end of generally C-shaped mechanism 84 to expand outwardly in the "A" direction indicated in FIG. 10B, such that protrusions 90 exert a radially outward force in the "B" direction indicated in FIG. 10B against fingers 70 which causes the radial expansion of fingers 70 against friction pads 72. When mechanism 84 is actuated, the resultant radially outward force exerted by the plurality of protrusions 90 on actuating fingers 70 pushes friction pads 72 against interface 64 of bushing 62. Once the resultant axial friction force reaches a sufficient value, motion between bushing 62 and friction pads 72 operatively attached to actuating fingers 70 is arrested, eliminating the slidable interface between bushing 62 and friction pads 72 such that actuator 83 and bushing 62 move together and are operatively connected as a single unit in response to input loads transmitted from interfaces 49, 59 through outer torsion bars 50, 51 to actuator assembly 82. When actuated such that actuator 83 and bushing 62 become operatively connected, outer torsion bars 50, 51 and actuator assembly 82 operatively define a secondary or outer torsion bar which is coaxial with inner torsion bar 48 and is of a length substantially equal to the length of inner torsion bar 48, such that when input loads are transmitted through interfaces 49 and 59, both inner torsion bar 48 and the secondary torsion bar defined by bars 50, 51 and actuator assembly 82 twist or deflect in response to the inputted loads, thereby providing additional stiffness control and capability to affect roll stability, as discussed for FIG. 6.

FIG. 11A shows an alternative construction of a smart actuator generally indicated at 102, which is shown in exploded view in FIG. 11B. Actuator 102 includes a generally cylindrical actuator body 100 which includes actuable fingers 106 and a first attachment interface or support surface 104, which as shown defines a spring seat 108. Actuator 102 further includes a first cover plate 92, a second cover plate 96, and an actuating mechanism 94, which is shown as a magnetorheological (MR) core 94 including MR fluid (not shown) and magnetic coils 98. Cover plates 92, 96 and MR core 94 are each configured with a plurality of slots such that fingers 106 are insertable through the plurality of slots in each of cover plates 92, 96 and MR core 94 as shown in the exploded view of FIG. 11B. When actuator 102 is in a non-actuated state, fingers 106 and the plurality of slots define a slidable interface such that sliding movement of actuator body 100 with respect to the plurality of slots and with respect to the longitudinal axis of generally cylindrical actuator 102 is unconstrained.

Magnetic coils 98 are distributed radially in MR core 94 to define an electromagnet. Magnetic coils 98 are operatively connected to an actuating source, which may be, for example, an electrical circuit through which current may be provided to coils 98 so as to create a magnetic field which activates the MR fluid in core 94. In a non-limiting example, coils 98 may be operatively connected to a switch or controller which is responsive to at least one sensor, where the at least one sensor is adaptable to sense at least one operating characteristic of the vehicle affecting suspension stiffness, control and stability. Coils 98 may be of a sufficient cross-sectional density and number of turns as required by the specific application, such that when actuated, coils 98 activate the MR fluid of core 94, exerting a force against fingers 106 and arresting the motion of fingers 106 such that fingers 106 cannot slide through the plurality of slots when actuator 100 is in an actuated state.

FIG. 12 shows, generally indicated at 110, a stiffness mechanism generally configured as a strut assembly, which may be, by way of non-limiting example, a suspension strut assembly adaptable for use in a vehicle. Assembly 110 includes a damper 118, a main spring 116, a first interface 114, a second interface 120, an actuator spring 112, and actuator 102 including actuator body 100 and MR core 94. Main spring 116 is in operative communication with or operatively attached to or located in, at a first end to first interface 114 and at a second end to second interface 120, which may define a spring seat. First interface 114 may define a spring seat and an attachment end configured to operatively attach assembly 110 to a vehicle body, chassis or suspension. Damper 118, which may also be referred to as a shock absorber, is configured as described for FIG. 4A, and is connected at one end to first interface 114. Damper 118 defines a second end which may be adapted for connection to, for example, a portion of a vehicle body, chassis or suspension. Damper 118 is in operative communication with second interface 120, which may be fixedly attached to damper 118, as described for FIG. 4A. Damper 118, interfaces 114, 120 and main spring 116 are collectively configurable as a conventional strut assembly, which may also be referred to as a coilover, as a coil over shock, or as a coilover shock assembly, as those terms are understood by one skilled in the art. Loads are inputted to the ends of assembly 110 responsive to changes in vehicle operating conditions, for example, such as turning, cornering, steering, braking or other maneuvers affecting suspension to wheel configuration and/or vehicle stability including vehicle roll and yaw, changes in tire to road contact caused by variations in road surface such as crowning, potholes, surface slickness or roughness, or other changes in vehicle condition. Loads input into assembly 110 are responded to or countered by extension and compression of main spring 116 and by extension and contraction of damper 118, as previously described for FIGS. 4A-4D.

Actuator spring 112 is in operative communication at a first end with first interface 114 and at a second end with spring holder 108 of actuator body 100. Actuator 102 including actuator body 100 and damper body 118 are configured such that, when actuator 102 is in a non-actuated state, fingers 106 of actuator body 100 are unconstrained and may move slidably along the axis of assembly 110 and within the plurality of slots defined by MR core 94 and cover plates 92, 96, such that actuator spring 112 remains in a non-activated or free state, e.g., actuator spring 112 is neither extended nor compressed and as such does not exert a spring force response to loads inputted to assembly 110, as previously discussed for FIGS. 4A-4D. Therefore, when actuator 102 is in a non-actuated state, the total stiffness (resisting force) of assembly 110 is equal to the stiffness of main spring 116 and the stiffness of damper 118.

When actuator 102 is actuated, for example, by a current supplied to magnetic coils 98 activating the MR fluid of core 94, actuator 102 exerts a force on fingers 106 which causes the sliding motion of actuator body 100 to be arrested, such that body 100 including spring holder 104 is constrained and actuator body 100 moves in conjunction with damper body 118 causing spring 112 to become activated and operational. When spring 112 is activated and engaged in parallel with primary spring 116 and damper 118, the total stiffness of assembly 110 is equal to the sum of the stiffness of main spring 116, the stiffness of damper 118 and the stiffness of the activated actuator spring 112.

During vehicle operation, and as described previously related to FIGS. 4A-4D, assembly 110 may be dynamically loaded, unloaded and reloaded in compression and tension and at varying loads. One or more sensors in operative communication with a controller or other means adaptable to actuate actuator 102 can be configured such that actuator 102 is dynamically actuated in response to sensor input to activate spring 112 thereby selectively and dynamically providing additional stiffness to assembly 110, e.g., with activation response times in a few milliseconds. By doing so, dynamic management of vehicle stiffness and stability during vehicle operation can be enhanced and improved.

Figure 13:
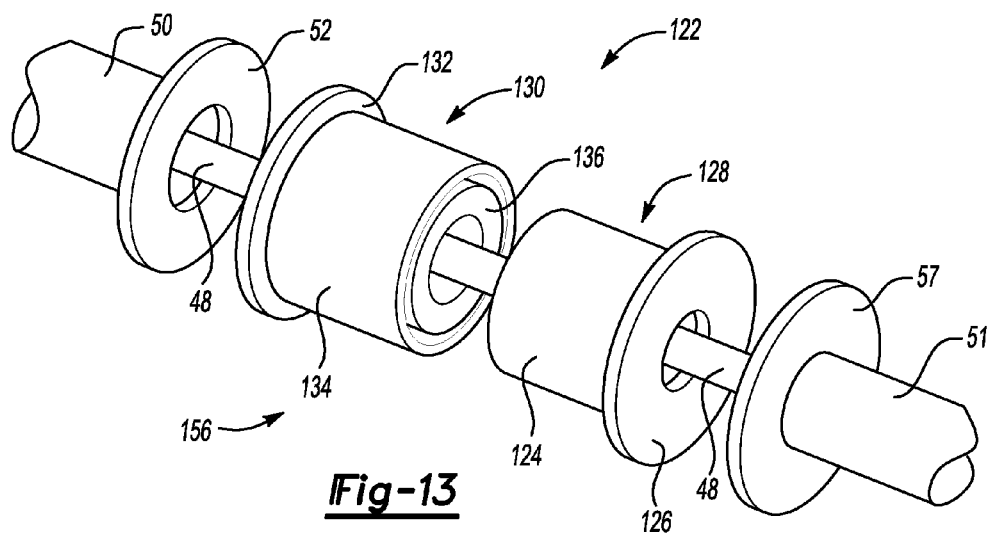
FIG. 13 is a partial schematic perspective view of a torsion bar assembly including a torque limiter assembly including the smart actuator of FIG. 11A.

FIG. 13 shows a torsion bar assembly 156 including an alternative construction of a smart actuator assembly generally indicated at 122. Torsion bar assembly 156 is adaptable, for example, for use in suspension module 58 of FIG. 6. Actuator assembly 122, which may be referred to as a coupling or torque limiting device, includes an actuator 130 and bushing 128. Bushing 128, which may also be referred to as a hub, drive hub or flanged bushing, defines a generally cylindrical interface 124 and a second attachment interface or flange 126. Flange 126 is configured to operatively attach or be connected to an attachment portion 57 of second outer torsion bar 51 when assembled into torsion bar assembly 156. Actuator assembly 130 includes a housing 134 which may be configured to seal or protect assembly 122 from contamination by, for example, road dirt, moisture or other contaminants. Housing 134 defines a first attachment interface 132 which is configured to operatively attach or be connected to an attachment portion 52 of first outer torsion bar 50 when assembled into torsion bar assembly 156. First and second torsion bars 50, 51 are operatively connected to suspension interfaces 49, 59 as shown in FIG. 6 and previously discussed.

Actuator 130 further includes an actuating mechanism 136 which is adaptable as a magnetorheological (MR) actuator or MR core 136. In an assembled configuration, MR core 136 is located proximate to interface 124 of bushing 128. A slidable interface, which may also be described as a rotatable interface, is defined between interface 124 and MR core 136 when assembled in torsion bar assembly 156 and with actuator 122 in a non-actuated state.

As discussed previously for FIG. 6, when input loads are transmitted through interfaces 49 and 59, outer torsion bars 50 and 51 twist or deflect in response. When actuator 122 is in a non-actuated condition, first outer torsion bar 50 and second outer torsion bar 51 are operatively disconnected by the slidable or rotatable interface between interface 124 and MR core 136 of actuator 122, such that first outer torsion bar 50 and second outer torsion bar 51 may move independently of each other in response to their respective input loads.

When actuator 122 is actuated, MR core 136 is activated and exerts a force on interface 124 which causes the motion between interface 124 and MR core 136 to be arrested, eliminating the sliding interface between interface 124 and MR core 136 such that actuator 130 and bushing 128 move together and are operatively connected as a single unit in response to input loads transmitted from interfaces 49, 59 through outer torsion bars 50, 51 to actuator assembly 122. When actuated such that actuator 130 and bushing 128 become operatively connected, outer torsion bars 50, 51 and actuator assembly 122 operatively define a single outer, or secondary, torsion bar which is coaxial with inner torsion bar 48 and is of a length substantially equal to the length of inner torsion bar 48, such that when input loads are transmitted through interfaces 49 and 59, primary (inner) torsion bar 48 and the secondary torsion bar defined by bars 50, 51 and actuator assembly 122 both twist or deflect in a combined response to the inputted loads, thereby providing additional stiffness control and capability to affect roll stability, as discussed for FIG. 6.

Figure 14:
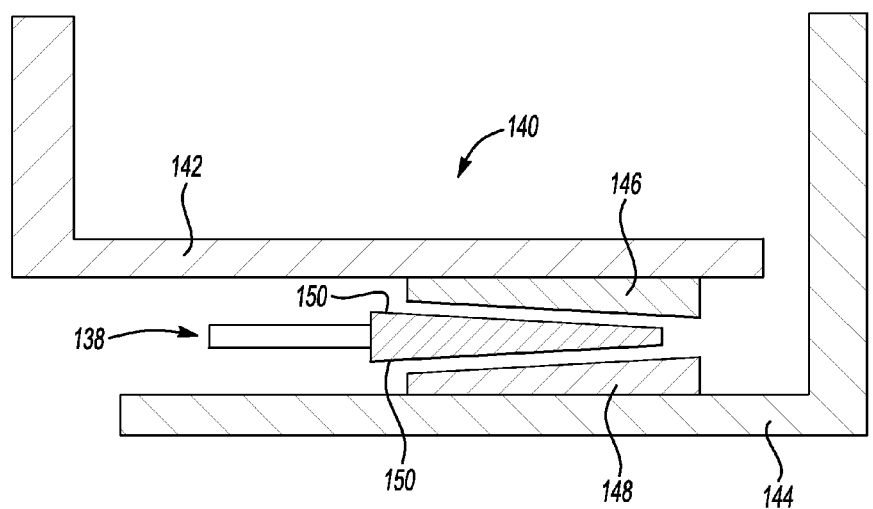
FIG. 14 is a schematic cross-sectional illustration of an alternative construction of a smart actuator.

FIG. 14 shows an alternative construction of a smart actuator assembly generally indicated at 140 which can be adapted to, for example, a stiffness element or used to control the relative motion of a first attachment interface 142 and a second attachment interface 144. Actuator assembly 140 further includes a first actuable surface 146 and a second actuable surface 148, which may be configured as, by way of non-limiting example, friction pads, wedges, bearing surfaces or other surfaces which are acted upon by actuating mechanism 138 including actuator surfaces 150. Actuating mechanism 138 may be configured to include any of a variety of smart actuators, for example, actuating mechanism 138 may include an SMA actuator, a MR actuator, an ER actuator, or a piezo-stack or other smart material actuator. Actuating mechanism 138 may be further adapted to be operatively connected to an actuating source, which may be, in a non-limiting example, an electrical circuit providing an electrical current, which may be operatively connected to one or more sensors, a switch, or a controller which is responsive to one or more sensors, the one or more sensors responsive to at least one operating characteristic of a stiffness control system, wherein the stiffness of the system may be affected by actuation of actuator assembly 140. Actuating mechanism 138 is shown in FIG. 14 in a non-limiting example as a tapered or wedge shaped element located proximate to actuable surfaces 146, 148, such that in a non-actuated state, interfaces 142 and 144 are moveable relative to each other and relative to surfaces 150 of mechanism 138. When actuator 138 is in an actuated state, surfaces 150 of actuator 138 interfere with or engagedly contact actuable surfaces 146, 148, such that relative movement between interfaces 142, 146 is arrested, constrained or prevented. As would be understood, actuator assembly 140 may be adapted with other configurations of actuable surfaces 146, 148 and actuator surfaces 150, where actuable surfaces 146, 148 and actuator surfaces 150 are configured and located proximate to each other such that a slidable interface is maintained between the surfaces when actuator 138 is in a non-actuated state, and such that motion between actuable surfaces 146, 148 and actuator surfaces 150 is arrested or prevented when actuator 138 is in an actuated state.

The example configurations shown in FIGS. 1A through 14 herein are intended to be non-limiting. By way of example, the stiffness elements and smart actuators as discussed herein may be adapted to non-vehicle systems and applications, such as non-vehicle suspension systems, material handling systems, pallet lift control systems, and anti-tilt and leveling mechanisms. In handling systems, for example, additional fixture force and grip force can be provided on demand and dynamically using stiffness control with smart actuators while significantly reducing system complexity and cost and resulting in lower mass overhead in comparison to other handling system configurations such as those configured with hydraulic actuators and electric motors.

While the best modes for carrying out the invention have been described in detail, those familiar with the art to which this invention relates will recognize various alternative designs and embodiments for practicing the invention within the scope of the appended claims.

The invention claimed is:

1. A stiffness control system, the system comprising:
    a first interface adaptable to transmit a first input load;
    a second interface adaptable to transmit a second input load;
    a first stiffness element operatively connected to the first interface and the second interface, wherein the first stiffness element is configured to be continuously responsive to a change in the first and second input loads;
    a second stiffness element including an actuator;
    wherein the actuator includes a smart material configured such that actuation of the smart material activates the second stiffness element;
    wherein the second stiffness element is configured in combination with the first stiffness element such that the second stiffness element is responsive to the change in the first and second input loads when activated; and
    wherein the actuator includes an actuable portion and an interfacing member in selective contact such that actuation of the smart material prevents movement of the actuable portion relative to the interfacing member.

2. The actuator of claim 1, wherein the smart material is a shape memory alloy (SMA) defining one of a SMA wire and a SMA spring.

3. The system of claim 1, wherein the actuator further comprises:
    an actuator body defining the actuable portion; and
    an actuating mechanism defined by the smart material;
    wherein the actuable portion and the interfacing member define a slidable interface when the actuating mechanism is non-actuated; and
    wherein the actuable portion and the interfacing member are in operative contact such that movement of the interfacing member relative to the actuator body is prevented when the actuating mechanism is actuated.

4. The actuator of claim 3, further comprising:
    a friction element;
    wherein the friction element is operatively connected to the actuable portion; and
    wherein actuation of the actuating mechanism causes the friction element to operatively contact the interfacing member preventing movement of the interfacing member relative to the actuator body relative to each other.

5. The system of claim 1 further comprising:
    an actuating source in operative communication with the actuator and configured to selectively actuate the smart material in response to the change in the first and second input loads.

6. The system of claim 5,
    wherein the actuating source is an electrical current provided by one of a sensor, a controller, a switch and a combination thereof.

7. The system of claim 1,
    wherein the first stiffness element includes a primary spring and a damper;
    wherein the second stiffness element includes a secondary spring which is operatively connected to the first interface and the second interface when the actuator is actuated; and is operatively disconnected from one of the first interface and the second interface when the actuator is not actuated.

8. The system of claim 1,
    wherein the first stiffness element defines a primary torsion bar;
    wherein the second stiffness element defines a secondary torsion bar which is selectively connected to the first interface and the second interface when the actuator is actuated.

9. The system of claim 8, wherein the secondary torsion bar comprises:
    a first torsion bar segment operatively connected to the first interface;
    a second torsion bar segment operatively connected to the second interface; and
    wherein the actuator is configured as one of a coupling and a torque limiting device, such that the first torsion bar segment and the second torsion bar segment are selectively connected to each other when the actuator is actuated.

10. The system of claim 1, further comprising:
    a third stiffness element including an actuator wherein the actuator includes a smart material;
    wherein the third stiffness element is activated by the actuator;
    wherein the actuator includes a smart material configured such that actuation of the smart material activates the third stiffness element;
    wherein the third stiffness element is configured such that the third stiffness element is responsive to the change in the first and second input loads when activated.

11. An actuator comprising:
    an actuator body defining an actuable portion including at least one finger;
    an actuating mechanism including a smart material;
    a stiffness element; and
    an interfacing member including at least one slot configured to accept the at least one finger;
    wherein the actuable portion and the interfacing member define a slidable interface when the actuating mechanism is non-actuated;
    wherein the actuable portion operatively contacts the interfacing member when the actuating mechanism is actuated such that movement of the interfacing member relative to the actuator body is prevented; and
    wherein operative contact between the interfacing member and the actuable portion activates the stiffness element.

12. The actuator of claim 11, further comprising:
    wherein the actuation of the actuating mechanism activates the stiffness element.

13. The actuator of claim 12, wherein the stiffness element is configured as one of a spring, a coupling, and a torque limiter.

14. The actuator of claim 11, wherein the interfacing member defines one of a spring holder, a coupling interface and a clutch face.

15. The actuator of claim 11, wherein the smart material is a shape memory alloy (SMA) defining one of a wire and a spring.

16. The actuator of claim 11, wherein the smart material is one of a magnetorheological (MR) material, an electrorheological (ER) material, a piezo-element, a piezo-stack, a magnetic shape memory alloy (MSMA), and a magnetostrictive material.

17. The actuator of claim 11, further comprising:
a friction element;
wherein the friction element is operatively connected to the actuable portion; and
wherein actuation of the actuating mechanism causes the friction element to operatively contact the interfacing member preventing movement of the interfacing member relative to the actuator body.

18. A method for controlling the stiffness of a load transmitting system; the method comprising:
providing a first stiffness element;
operatively connecting the first stiffness element to a first system interface and to a second system interface, such that load transmitted through the first system interface and the second system interface is transmitted through the first stiffness element;
providing a continuous response to the transmitted load from the first stiffness element;
providing a second stiffness element including an actuator, wherein the actuator includes a magnetorheological material configured such that actuation of the magnetorheological material activates the second stiffness element;
selectively activating the second stiffness element actuating the actuator, such that load transmitted through the first system interface and the second system interface is transmitted through the second stiffness element; and
providing a combined response to the transmitted load from the first stiffness element and the second stiffness element when the actuator is actuated.

19. The method of claim 18, further comprising:
sensing a change in the transmitted load;
activating and de-activating the second stiffness element in response to the change in the transmitted load, such that the stiffness of the system is dynamically changed in response to changes in the transmitted load.

20. The method of claim 18, wherein the load transmitting system is adaptable to the suspension system of a vehicle.

* * * * *